United States Patent
Ishiguro et al.

(10) Patent No.: US 7,440,639 B2
(45) Date of Patent: *Oct. 21, 2008

(54) IMAGE READING APPARATUS READING AN ORIGINAL WHILE TRANSPORTING THE SAME

(75) Inventors: Kazuhiro Ishiguro, Toyohashi (JP); Masaaki Saka, Toyokawa (JP); Takayuki Nabeshima, Toyokawa (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 609 days.

This patent is subject to a terminal disclaimer.

(21) Appl. No.: 11/019,520

(22) Filed: Dec. 23, 2004

(65) Prior Publication Data
US 2006/0072169 A1 Apr. 6, 2006

(30) Foreign Application Priority Data
Sep. 30, 2004 (JP) .............................. 2004-285826

(51) Int. Cl.
G06K 7/00 (2006.01)
H04N 1/04 (2006.01)
G06K 9/20 (2006.01)

(52) U.S. Cl. .................. 382/312; 358/494; 358/474

(58) Field of Classification Search ................ 382/162, 382/164, 173, 190, 218–219, 260–264, 312, 382/167, 181, 294; 358/461, 486, 497, 514, 358/1.1, 3.26, 463, 474, 496, 494, 501, 504, 358/512, 518

See application file for complete search history.

(56) References Cited

U.S. PATENT DOCUMENTS 5,317,420 A 5/1994 Kuwahara 5,850,293 A 12/1998 Suzuki et al.

(Continued)

FOREIGN PATENT DOCUMENTS

JP 9-139844 5/1997

(Continued)

OTHER PUBLICATIONS

U.S. Appl. No. 11/012,184, filed Dec. 16, 2004, Ishiguro et al.

(Continued)

Primary Examiner—Amir Alavi
(74) Attorney, Agent, or Firm—Morrison & Foerster LLP

(57) ABSTRACT

An image reading apparatus includes: three line sensors; a mover moving a platen at a rate relative to the three line sensors; an interline corrector synchronizing the three line sensors' outputs to be a pixel having read a single location on an original; NOR and AND devices comparing three data corresponding to a single location on the original to detect a noise pixel; a determiner depending on a color of a pixel neighboring a pixel to be processed selected from pixels arranged in the main scanning direction, to determine first data from which a noise pixel is initially detected; and a determiner invalidating a noise pixel identical in location in the main scanning direction to the pixel to be processed, that is included in a line input prior to a line including the pixel detected from the first data and that is detected from data other than the first data.

18 Claims, 18 Drawing Sheets

U.S. PATENT DOCUMENTS

| | | |
|---|---|---|
| 5,982,946 A | 11/1999 | Murakami |
| 6,125,213 A | 9/2000 | Morimoto |
| 6,215,512 B1 * | 4/2001 | Imaizumi et al. ............. 347/234 |
| 6,323,959 B1 * | 11/2001 | Toyama et al. .............. 382/312 |
| 6,441,915 B1 * | 8/2002 | Imaizumi et al. ........... 358/1.15 |
| 6,625,331 B1 * | 9/2003 | Imaizumi et al. ............ 382/294 |
| 6,631,207 B2 * | 10/2003 | Hirota et al. ................ 382/167 |
| 6,728,418 B1 | 4/2004 | Kumagai et al. |
| 6,806,902 B1 | 10/2004 | Donovan |
| 7,046,861 B2 * | 5/2006 | Imaizumi et al. ............ 382/294 |
| 7,072,075 B2 | 7/2006 | Kondo et al. |
| 7,079,685 B1 * | 7/2006 | Hirota et al. ................ 382/167 |
| 7,283,164 B2 | 10/2007 | Kakarala et al. |
| 7,382,406 B2 | 6/2008 | Higuchi |
| 2001/0026380 A1 | 10/2001 | Imoto |
| 2002/0136463 A1 | 9/2002 | Akahori et al. |
| 2006/0066915 A1 | 3/2006 | Saka et al. |
| 2006/0066916 A1 | 3/2006 | Ishiguro et al. |
| 2006/0066917 A1 | 3/2006 | Ishiguro et al. |
| 2006/0066918 A1 | 3/2006 | Ishiguro et al. |
| 2006/0066919 A1 | 3/2006 | Saka et al. |
| 2006/0066920 A1 | 3/2006 | Saka et al. |
| 2006/0066921 A1 | 3/2006 | Saka et al. |
| 2006/0072169 A1 * | 4/2006 | Ishiguro et al. ............. 358/494 |
| 2006/0072826 A1 | 4/2006 | Ishiguro et al. |
| 2006/0098248 A1 | 5/2006 | Suzuki et al. |

FOREIGN PATENT DOCUMENTS

| | | |
|---|---|---|
| JP | 10-228536 | 8/1998 |
| JP | 11-266373 | 9/1999 |
| JP | 2000-278485 | 10/2000 |
| JP | 2000-324312 | 11/2000 |
| JP | 2001-103249 | 4/2001 |
| JP | 2001-272829 | 10/2001 |
| JP | 2002-77584 | 3/2002 |
| JP | 2002-185767 | 6/2002 |
| JP | 2002-271631 | 9/2002 |
| JP | 2002-354262 | 12/2002 |
| JP | 2003-8846 | 1/2003 |
| JP | 2003-259096 | 9/2003 |
| JP | 2003-315933 | 11/2003 |
| JP | 2004-112611 | 4/2004 |

OTHER PUBLICATIONS

U.S. Appl. No. 11/012,231, filed Dec. 16, 2004, Ishiguro et al.
U.S. Appl. No. 11/017,662, filed Dec. 22, 2004, Ishiguro et al.
U.S. Appl. No. 11/019,181, filed Dec. 23, 2004, Ishiguro et al.
U.S. Appl. No. 11/019,712, filed Dec. 23, 2004, Saka et al.
U.S. Appl. No. 11/020,209, filed Dec. 27, 2004, Saka et al.
U.S. Appl. No. 11/020,232, filed Dec. 27, 2004, Suzuki et al.
U.S. Appl. No. 11/020,233, filed Dec. 27, 2004, Saka et al.
U.S. Appl. No. 11/020,479, filed Dec. 27, 2004, Saka et al.

* cited by examiner

F I G. 3
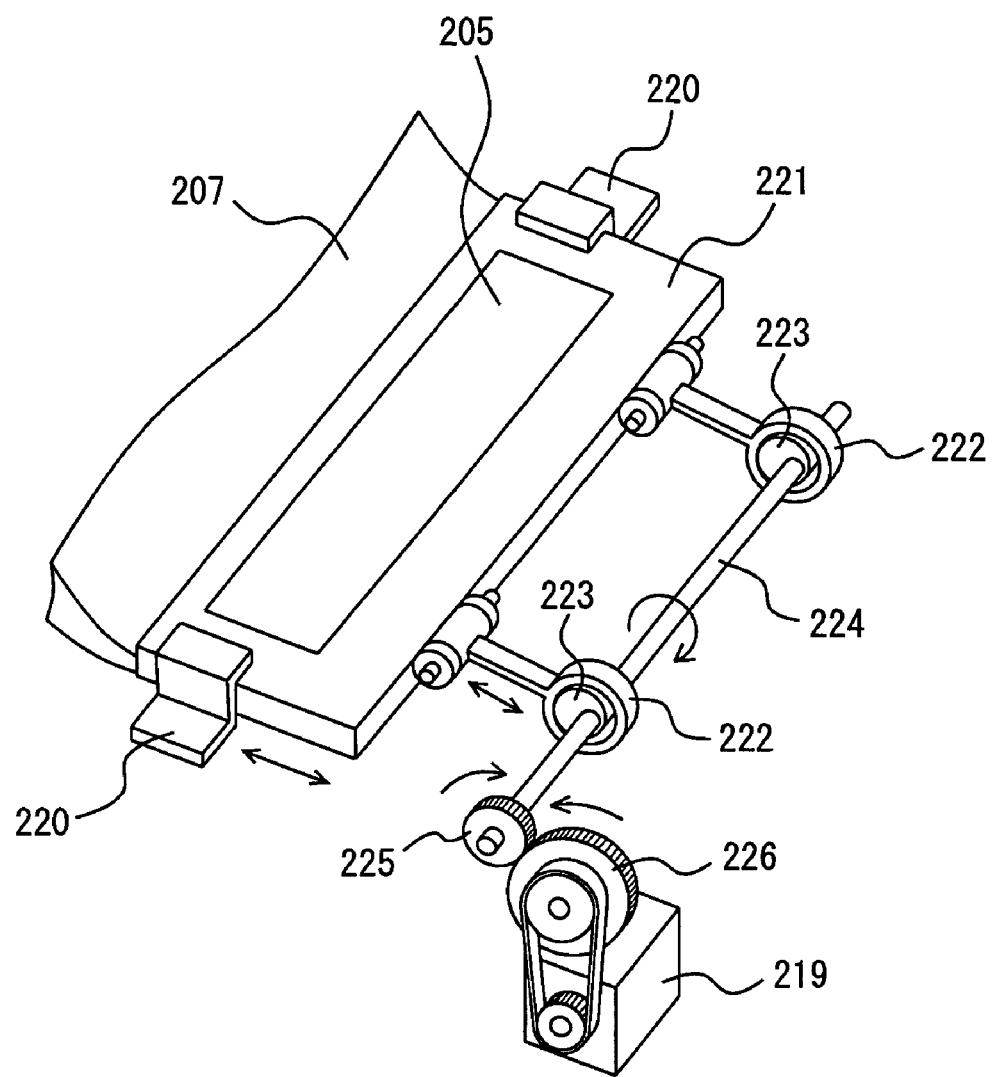

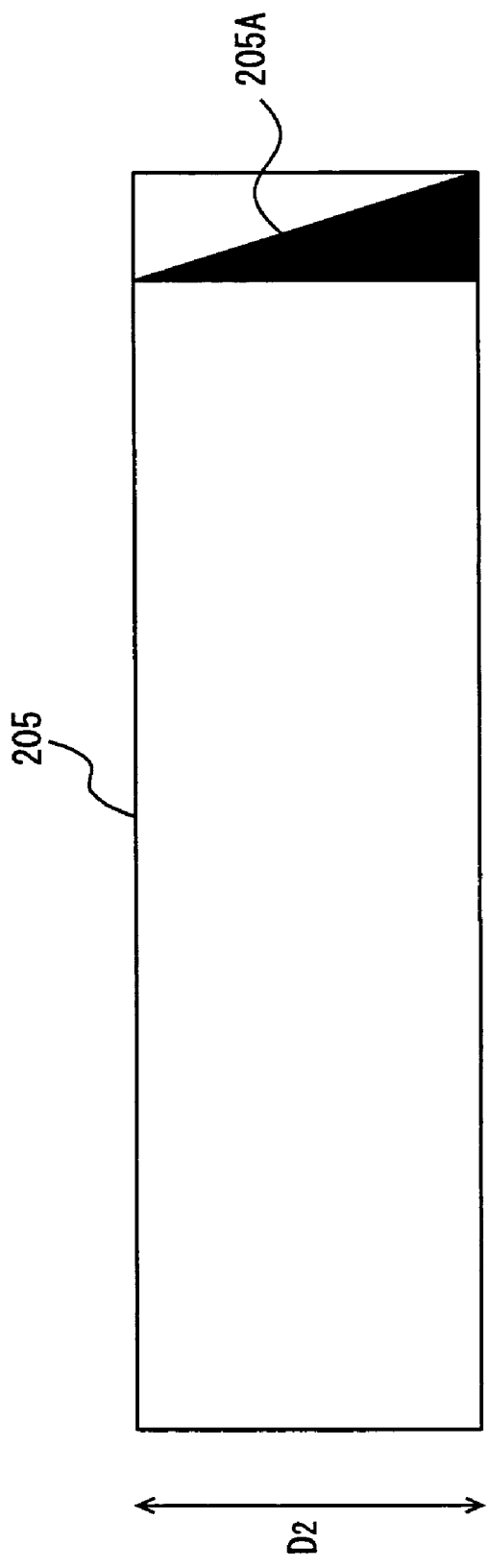

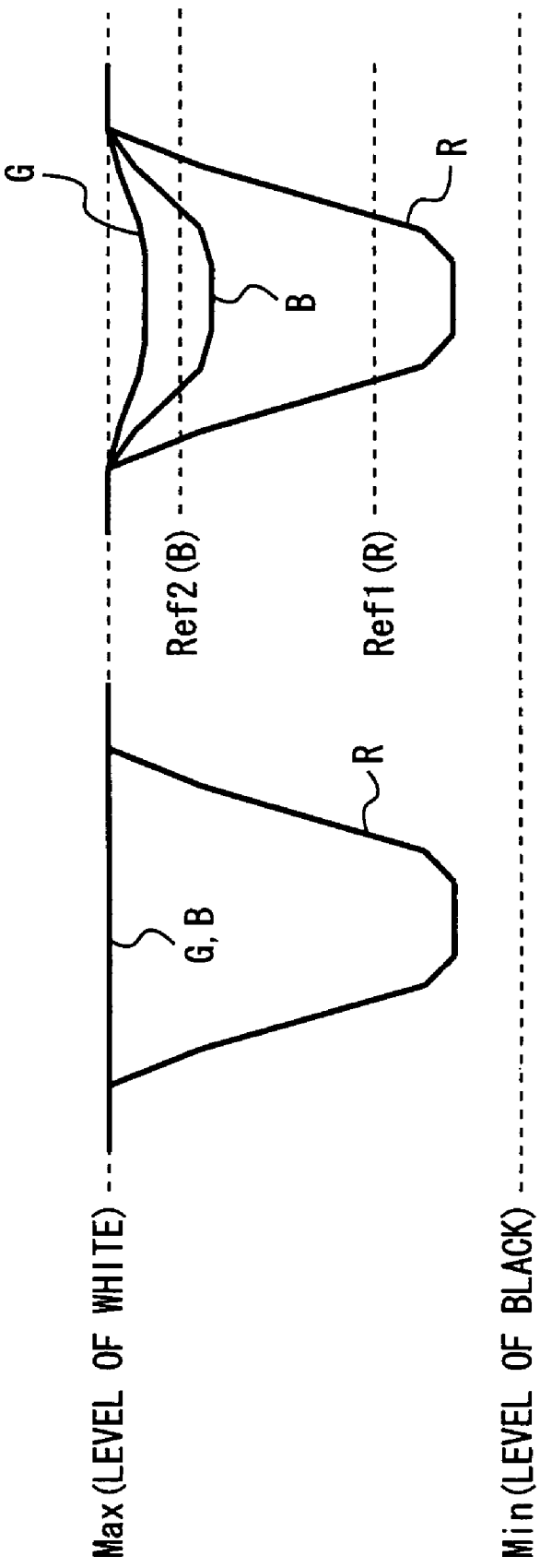

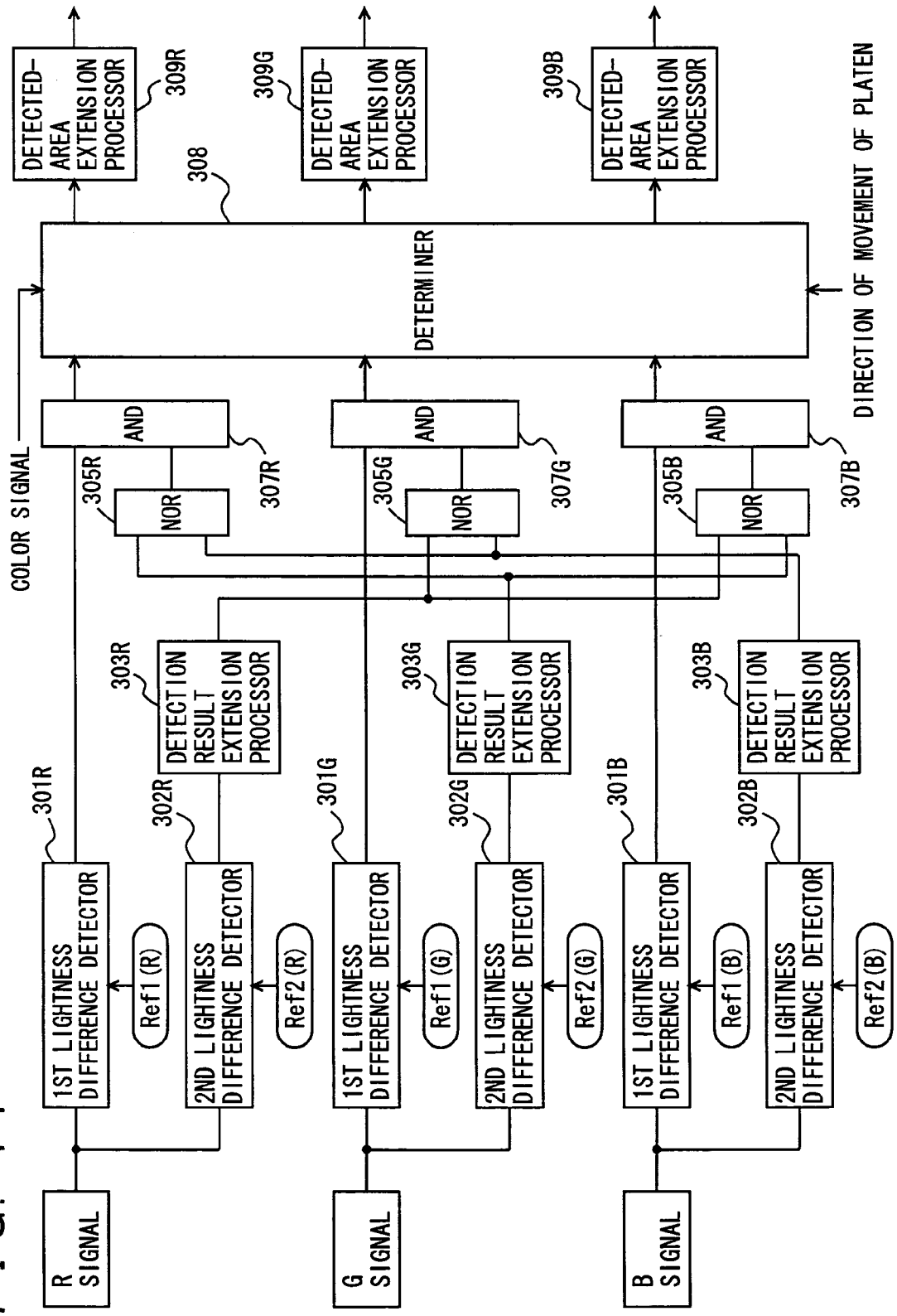

F I G. 1 5

| SURROUNDING COLOR \ DIRECTION OF MOVEMENT OF PLATEN | SAME AS ORIGINAL | OPPOSITE TO ORIGINAL |
|---|---|---|
| ACHROMATIC COLOR | R → G → B | B → G → R |
| RED (R) | R | R |
| MAGENTA (M) | R → B | B → R |
| BLUE (B) | B | B |
| CYAN (C) | G → B | B → G |
| GREEN (G) | G | G |
| YELLOW (Y) | R → G | G → R |

IMAGE READING APPARATUS READING AN ORIGINAL WHILE TRANSPORTING THE SAME

This application is based on Japanese Patent Application No. 2004-285826 filed with the Japan Patent Office on Sep. 30, 2004, the entire content of which is hereby incorporated by reference.

BACKGROUND OF THE INVENTION

1. Field of the Invention

The present invention relates generally to image reading apparatuses and particularly to image reading apparatuses reading an original while transporting it.

2. Description of Related Art

Conventionally digital copiers and similar image reading apparatuses employ a technique referred to as so-called "reading an original while passing the original." More specifically, an original is transported relative to a fixed line sensor in a sub scanning direction orthogonal to the line sensor as the original is read.

Such image reading apparatus is provided with a transparent platen between the original and the line sensor to fix a position at which a transported original is read. The original reflects light which is in turn received via the platen by the line sensor.

As such, if dust, paper particles, flaws or other similar foreign matters (hereinafter generally referred to as "dust") adhered on the platen's reading position, the line sensor will read the dust while reading a transported original. This provides an output image with noise in the form of a line in the sub scanning direction.

Japanese Laid-Open Patent publication No. 2000-278485 describes an image reading apparatus that detects noise caused by dust adhering on a platen glass's reading position from a read image by oscillating the platen in a main scanning direction as the apparatus reads an original. This image reading apparatus detects a specific waveform appearing in an image as noise generated by reading dust.

The image reading apparatus described in Japanese Laid-Open Patent publication No. 2000-278485, however, employs pattern-matching to detect the specific waveform appearing in an image. As such, if an original includes such a pattern, the apparatus would erroneously detect the pattern.

SUMMARY OF THE INVENTION

The present invention has been made to overcome the above disadvantage and contemplates an image reading apparatus capable of detecting with improved precision noise generated in an image by dust existing on a platen.

To achieve the above object the present invention in one aspect provides an image reading apparatus including: at least three line sensors having filters, respectively, different in spectral sensitivity, and arranged in a predetermined order in a subscanning direction with a distance therebetween to scan an original in the subscanning direction; a platen arranged between the original and the line sensors; a mover moving the platen at a rate relative to the line sensors, the rate being different from that of the original relative to the line sensors; an interline corrector receiving at least three data from the three line sensors to synchronize the data to be a pixel having read a single location on the original; and a noise pixel detector receiving the data synchronized by the interline corrector, one line at a time, sequentially, and the noise pixel detector includes: an extractor extracting from each of the data a feature pixel having a predetermined feature; a detector comparing the data output from the line censors corresponding to a single location on the original to detect the feature pixel extracted from one of the data, as a noise pixel if the feature pixel is not a feature pixel for each of the data other than one of the data; a color determiner determining a color of each pixel from the data; a determiner depending on a color of a pixel neighboring a pixel to be processed selected from pixels arranged in the main scanning direction, to determine among the data first data from which a noise pixel is initially detected; and a noise pixel determiner invalidating a noise pixel detected by the detector identical in location in the main scanning direction to the pixel to be processed, that is included in a line input prior to a line including the noise pixel detected from the first data and that is detected from data other than the first data.

In accordance with the present invention an original is scanned in a sub scanning direction by at least three line sensors having filters, respectively, different in spectral sensitivity, and arranged in a predetermined order in the subscanning direction with a distance therebetween to scan the original in the subscanning direction and between the original and the line sensors there is provided a platen moving at a rate relative to the line sensors, the rate being different from that of the original relative to the line sensors. When the platen has dust adhering thereon, the dust is read by the line sensors sequentially. As the platen is moved at a rate relative to the line sensors, the rate being different from that of the original relative to the line sensors, the dust on the platen is read by each line sensor at a different location on the original. The image reading apparatus synchronizes at least three data output from the line sensors to be a pixel having read a single location on the original, and the synchronized, at least three data are input, one line at a time, sequentially, and the apparatus extracts from each of the data a feature pixel having a predetermined feature, compares the data corresponding to a single location on the original to detect a feature pixel, extracted from one of the data, as a noise pixel if the feature pixel is not a feature pixel for all of the other data. Furthermore the image reading apparatus depends on a color of a pixel neighboring a pixel to be processed selected from pixels arranged in the main scanning direction, to determine among the data first data from which a noise pixel is initially detected, and invalidates a noise pixel detected identical in location in the main scanning direction to the pixel to be processed, that is included in a line input prior to a line including the noise pixel detected from the first data and that is detected from the first data other than the first data. The apparatus can thus detect the noise generated by dust existing on the platen from an image of a read original with higher precision.

The present invention in another aspect provides an image reading apparatus including: at least three line sensors having filters, respectively, different in spectral sensitivity, and arranged in a predetermined order in a subscanning direction with a distance therebetween to scan an original in the subscanning direction; a platen arranged between the original and the line sensors; a mover moving the platen at a rate relative to the line sensors, the rate being different from that of the original relative to the line sensors; an interline corrector receiving at least three data from the line sensors to synchronize the data to be a pixel having read a single location on the original; and a noise pixel detector receiving the data synchronized by the interline corrector, one line at a time, sequentially, and the noise pixel detector includes: an extractor extracting from each of the data a feature pixel having a predetermined feature; a detector comparing the data corresponding to a single location on the original to detect the feature pixel extracted from one of the data, as a noise pixel if the feature pixel is not a feature pixel for each of the data other than one of the data; a color determiner determining a color of each pixel from the data; an order determiner depending on a color of a pixel neighboring a pixel to be processed selected from pixels arranged in the main scanning direction, to determine an order of the data in which a noise pixel is detected; and a noise pixel determiner invalidating a noise pixel detected by the detector identical in location in the main scanning direction to the pixel to be processed, that is included in a line input prior to a line including first data for which a decision is made that a noise pixel is initially detected and that is detected from second data for which a decision is made that a noise pixel is subsequently detected.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a perspective view of a mechanism employed to oscillate a platen.

FIG. 5 is a rear plan view of the platen.

FIGS. 10A and 10B show one example of RGB signal output from a reader.

FIG. 11 is a block diagram showing a configuration of a noise detection processor of the image reading apparatus of the present embodiment.

FIG. 15 shows one example of a decision table referenced by the determiner.

DESCRIPTION OF THE PREFERRED EMBODIMENTS

Figure 1:
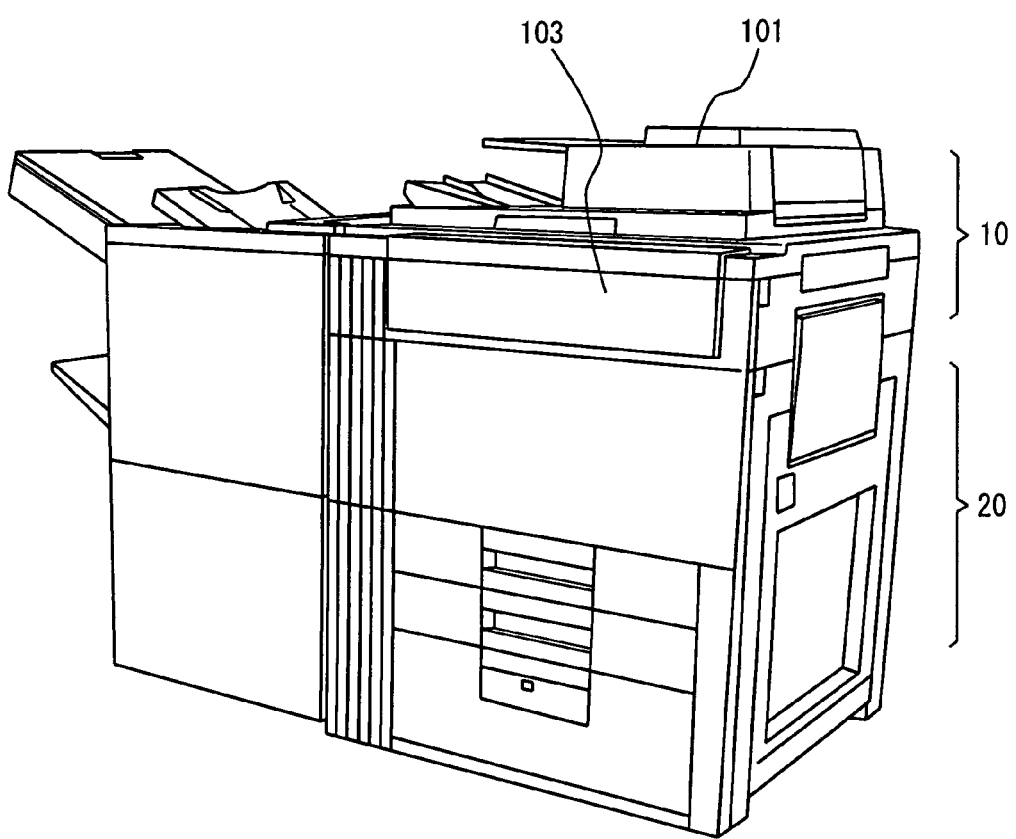
FIG. 1 is a perspective view of an MFP including an image reading apparatus in one embodiment of the present invention.

Hereinafter reference will be made to the drawings to describe embodiments of the present invention. In the following description, like components are denoted by like reference characters and also identical in name and function.

FIG. 1 is a perspective view of a multi-function peripheral (MFP) including an image reading apparatus in one embodiment of the present invention. With reference to the figure, the MFP includes an image reading apparatus 10 operative to read an original image, and an image forming apparatus 20 provided under image reading apparatus 10. The MFP forms an image read by image reading apparatus 10 on a sheet of paper or similar recording medium. Furthermore, the MFP includes a communications interface to connect with a facsimile device, a local area network (LAN), a public line or similar network.

Figure 2:
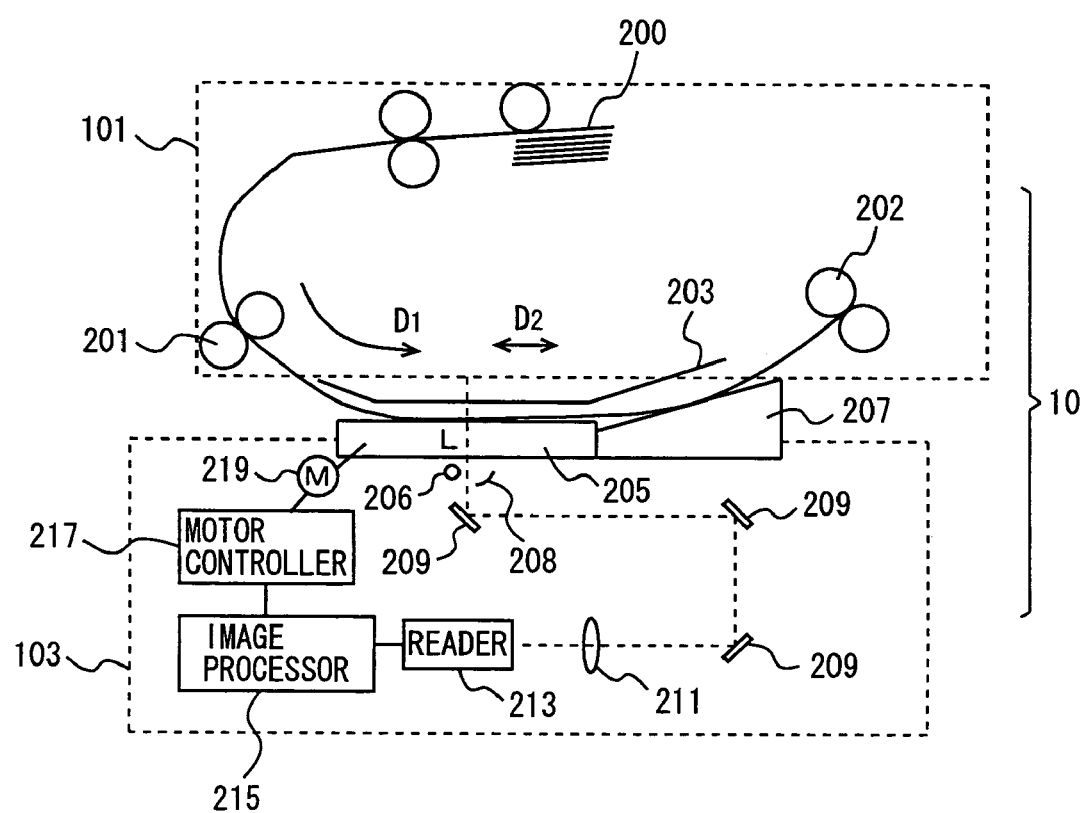
FIG. 2 schematically shows the image reading apparatus's internal structure.

FIG. 2 schematically shows an internal configuration of image reading apparatus 10. Image reading apparatus 10 includes an automatic document feeder (ADF) 101 and a main body 103. ADF 101 includes an upper restraint plate 203 guiding a transported original in the vicinity of an original reading position, a timing roller pair 201 transporting the original to the original reading position, and a roller pair 202 transporting the original having moved past the reading position.

Main body 103 includes a platen 205 formed of a transparent member, a sheet passage guide 207 forming a portion of a path of the original, a source of light 206 illuminating the original at the reading position, a reflector member 208 reflecting the light emitted from the source of light, a reader 213 having three line sensors arranged in a sub scanning direction, a reflector mirror 209 arranged to reflect light reflected from the original and guide the reflection of light to reader 213, a lens 211 focusing the reflection of light on reader 213, an image processor 215 processing an electrical signal output from reader 213, a motor 219 operative to oscillate platen 205, and a motor controller 217 operative in response to a control signal received from image processor 215 to control the driving of motor 219.

An original 200 is transported by timing roller pair 201 between platen 205 and upper restraint plate 203 in a direction D1. The original being transported has its image read at a reading position L by reader 213 successively. ADF 101 transports an original in the sub scanning direction, as seen at a reading position L. During the image reading operation, platen 205 is oscillated by motor 219 in a direction D2. Platen 205 oscillates in a direction substantially parallel to the sub scanning direction.

Reader 213 includes three line sensors each having a plurality of photoelectric conversion elements arranged in a main scanning direction substantially perpendicular to the sub scanning direction. The three line sensors have filters, respectively, different in spectral sensitivity and receive light reflected from an original through the filters. More specifically, the sensors have filters transmitting light of waveforms of red (R), green (G) and blue (B). Thus, the line sensor having the filter of red (R) outputs an R signal, an electrical signal indicating an intensity of red light of light reflected from an original, the line sensor having the filter of green (G) outputs a G signal, an electrical signal indicating an intensity of green light of light reflected from the original, and the line sensor having the filter of blue (B) outputs a B signal, an electrical signal indicating an intensity of blue light of light reflected from the original.

The three line sensors are arranged in the sub scanning direction in a predetermined order with a predetermined distance therebetween. In this example, the line sensors are spaced by a distance corresponding to three original reading lines, and arranged, red first, followed by green and then blue as seen in the direction in which an original is transported, although the line sensors may be spaced by different distanced and arranged in different orders.

The three line sensors thus spaced and arranged simultaneously receive at the same timing the light reflected by an original at different locations. As such, the light reflected by the original at a location is initially received by the red light receiving line sensor, subsequently by the green light receiving line sensor, and finally by the blue light receiving line sensor. This delay is adjusted by image processor 215, as will be described later.

Note that while in the present embodiment reader 213 is provided with three line sensors, it may be provided with four or more line sensors.

FIG. 3 is a perspective view showing a mechanism employed to oscillate the platen. With reference to the figure, platen 205 is held by a platen holder 221 held slidably in the sub scanning direction by a guide 220 fixed to the main body of image reading apparatus 10. Platen holder 221 has one surface with two arms 222 connected thereto. Arm 222 has the other end provided with a circular hole.

A shaft 224 at portions corresponding to the two arms 222 has two cams 223 attached thereto. Furthermore, shaft 224 has one end with a gear 225 attached thereto. Gear 225 is arranged to mesh with a gear 226 linked by a belt to the motor 219 drive shaft. As motor 219 runs, the motor's rotation is transmitted by the belt to gear 226, and gear 226 thus rotates. As gear 226 rotates, gear 225 and shaft 224 rotate.

Cam 223 is arranged in the circular hole of arm 222. As such, as shaft 224 rotates, the two cams 223 accordingly provide rotation, which is converted to translation movement of platen holder 221.

Note that platen 205 may be oscillated by a mechanism other than that described above. For example, the platen may be oscillated by a mechanism employing a driving source, such as a piston utilizing an electromagnet, air pressure, hydraulic pressure and the like, causing linear movement.

Platen 205 is oscillated parallel to the sub scanning direction. When platen 205 is moving in a direction opposite that in which an original is transported, platen 205 and the original moves in the opposite directions. As such, the speed of platen 205 relative to line sensors 213R, 213G, 213B and that of the original relative to the line sensors are different. In contrast, when platen 205 is moving in the direction in which the original is transported, the speed of platen 205 and that of the original transported are the same in direction. Preferably, they should be different in rate. Note that while herein platen 205 is oscillated parallel to the sub scanning direction, the platen may be oscillated in different directions.

Figure 4A:
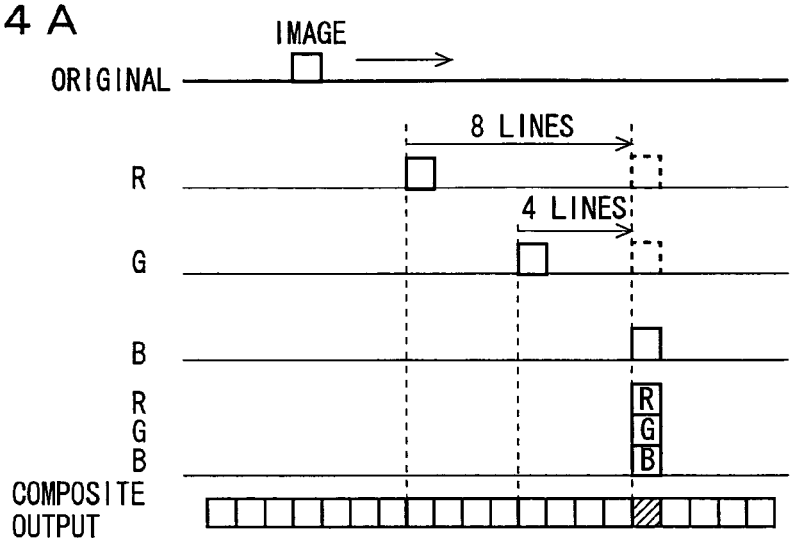
FIGS. 4A-4C are diagrams for illustrating a theory of detecting noise generated by reading dust from a read image.
Figure 4B:
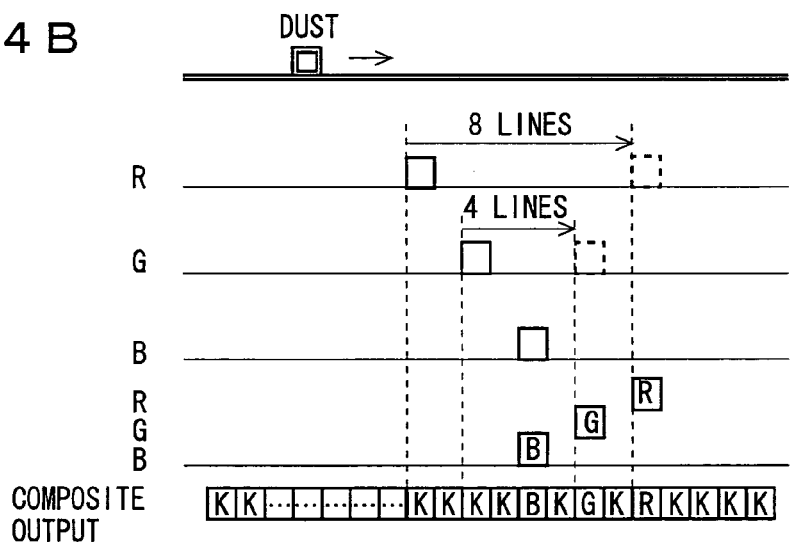
Figure 4C:
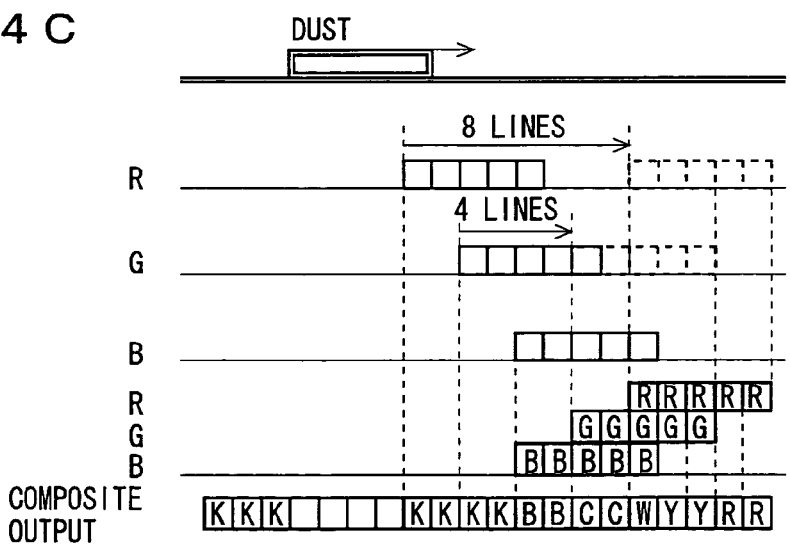

In the present embodiment image reading apparatus 10 detects noise generated by dust adhering on platen 205 from a read image in accordance with a theory as described hereinafter. FIGS. 4A-4C are diagrams for illustrating the theory. For the sake of illustration, an original and platen 205 are transported in the figures in a direction indicated by an arrow, and platen 205 moves at a rate which is the same in direction as and twice in magnitude that at which the original is transported. Furthermore for the sake of illustration the three line sensors are red light, green light and blue light receiving line sensors arranged red first, followed by green and then blue in the direction in which the original is transported, with a distance corresponding to three lines therebetween. R, G and B indicate outputs of the red light, green light and blue light receiving line sensors, respectively.

FIG. 4A is a diagram for illustrating interline correction. The image of a portion of the original is initially read by the red light receiving line sensor arranged most upstream in the direction in which the original is transported. The image is then transported by a distance corresponding to four lines, and read by the green light receiving line sensor. The image is further transported by a distance corresponding to four lines, and read by the blue light receiving sensor.

Thus an image located in an original at a single location is read by three line sensors at different times. As such, the three line sensors output signals offset in timing. Interline correction synchronizes the signals output from the three line sensors so that the signals all correspond to a single location in the original. More specifically, output R is delayed by eight lines and output G is delayed by four lines.

Interline corrected outputs R, G and B are composited to provide a composite output, which corresponds to outputs R, G and B read at a single location in an original and composited together.

FIG. 4B is a diagram for illustrating a composite output provided when dust adhering on a platen is read. The dust adhering on platen 205 is initially read by the red light receiving line sensor arranged most upstream in the direction in which an original is transported. The dust is transported by a distance corresponding to four lines, and read by the green light receiving line sensor. Since platen 205 moves in the same direction as the original at a rate twice that at which the original is transported, the dust moves by four lines in a period of time required for a line sensor to read the original by two lines. As such, between the time point at which the red line sensor reads the dust and that at which the green line sensor reads the dust there is introduced an offset by a period of time corresponding to reading two lines. Furthermore, the dust is transported by a distance corresponding to four lines, and read by the blue light receiving line sensor. Since platen 205 moves in the same direction as the original at a rate twice that at which the original is transported, between the time point at which the green line sensor reads the dust and that at which the blue line sensor reads the dust there is introduced an offset by a period of time corresponding to reading two lines.

By interline correction the red light receiving line sensor reading the dust outputs R delayed by eight lines and the green light receiving line sensor reading the dust outputs G delayed by four lines. As such, interline corrected outputs R, G and B composited together provide a composite output in which outputs R, G and B with the dust read are not composited at the same timing, offset by two lines.

Note that the figure shows a composite output provided when paper particles or similar white dust adhere on platen 205 and a black original is read. Despite that the white dust is read, the composite output is not white but rather an output of blue, green and red divided in three lines.

Thus dust adhering on platen 205 is divided in an image into a plurality of lines. Noise caused by reading dust can be smaller than when reading without moving platen 205.

FIG. 4C is another diagram for illustrating a composite output provided when dust adhering on a platen is read. The figure shows an example of reading dust having a size corresponding to ten lines in the sub scanning direction. Platen 205 moves in the same direction as an original at a rate twice that at which the original is transported. As such, the dust is read as having a size corresponding to five lines.

The dust adhering on platen 205 is initially read by the red light receiving line sensor arranged most upstream in the direction in which the original is transported. The dust is then transported by a distance corresponding to four lines, and read by the green light receiving line sensor. Between the time point at which the red line sensor reads the dust and that at which the green line sensor reads the dust there is introduced an offset by a period of time corresponding to reading two lines. The dust further is transported by a distance corresponding to four lines, and read by the blue light receiving line sensor. Between the time point at which the green line sensor reads the dust and that at which the blue line sensor reads the dust there is introduced an offset by a period of time corresponding to reading two lines.

By interline correction the red light receiving line sensor reading the dust outputs R delayed by eight lines and the green light receiving line sensor reading the dust outputs G delayed by four lines. As such, interline corrected outputs R, G and B composited together provide a composite output in which outputs R, G and B by five lines with the dust read are not composited at the same timing, offset by two lines. Note that the figure shows a composite output provided when paper particles or similar white dust adhere on platen 205 and a black original is read. Despite that the white dust is read, the composite output is an output varying in color, first in blue, followed by cyan, white yellow and then red.

The dust adhering on platen 205 is thus divided in an image into a plurality of lines, which are extracted for each color as a feature point to detect noise. Furthermore, such division also reduces noise caused by reading the dust.

FIG. 5 is a plan, rear view of the platen. With reference to the figure, platen 205 has one end with a mark 205A having a single color and a geometry having in the main scanning direction a length varying depending on the position in the sub scanning direction. In this description, mark 205A is a black triangle. Furthermore, mark 205A has one side arranged parallel to one side of platen 205.

Reader 213 or a sensor provided separate from reader 213 and fixed to main body 103 can be used to detect the length of mark 205A in the main scanning direction to detect the position of platen 205 relative to reader 213.

Figure 6:
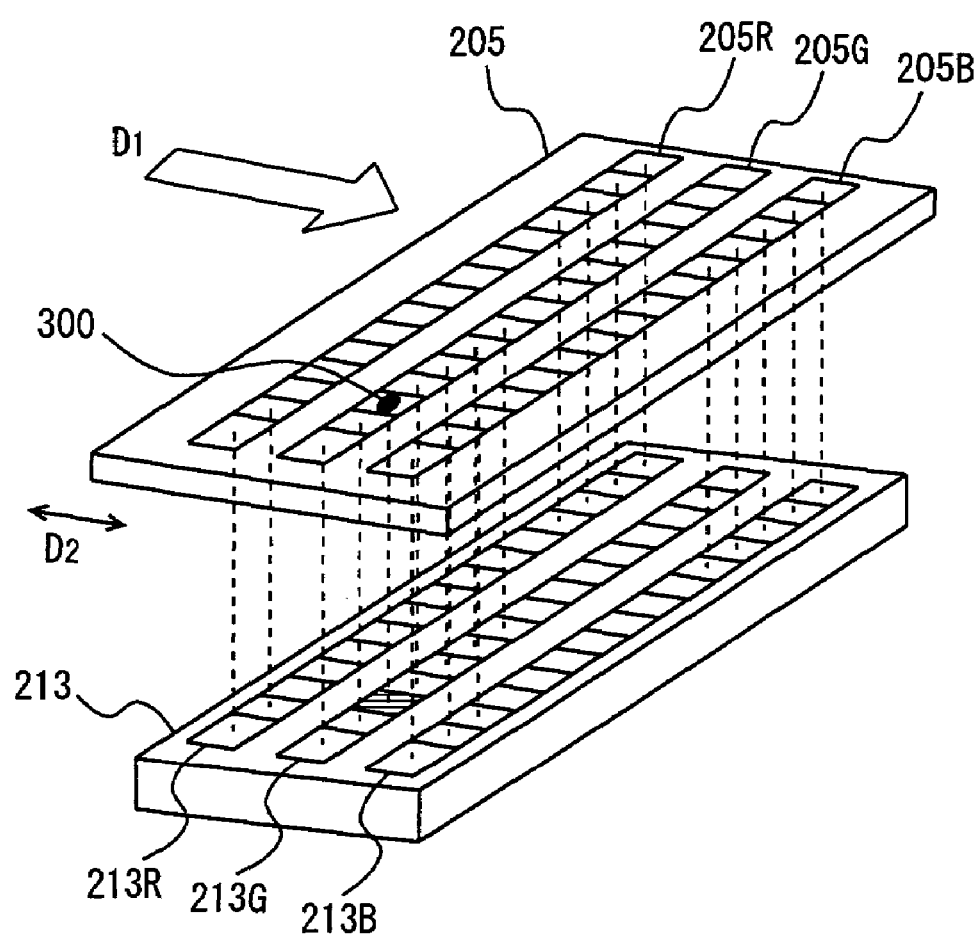
FIG. 6 shows a position on a platen read by a reader.

FIG. 6 shows a location on platen 205 read by reader 213. Reader 213 has line sensors 213R, 213G and 213B having filters of red (R), green (G) and blue (B), respectively, arranged in a direction in which an original is transported D1, red first, followed by green and then blue.

Line sensors 213R, 213G and 213B receive light transmitted through platen 205 at regions 205R, 205G and 205B, respectively. Regions 205R, 205G and 205B are arranged to be spaced by three lines. The original initially moves fast region 205R, then region 205G and finally region 205B. As such, light reflected by the original at a location is initially received by the red light receiving line sensor 213R, then the green light receiving line sensor 213G, and finally the blue light receiving line sensor 213B. Line sensors 213R, 213G, 213B spaced by three lines thus will not simultaneously receive light reflected by the original at a single location.

If platen 205 has adhering thereto dust 300 having a maximal length of at most four lines, then dust 300 will not exist at two or more of regions 205R, 205G, 205B concurrently as platen 205 moves oscillating parallel to the sub scanning direction. FIG. 6 shows a case where dust 300 exists at region 205G. In this case, light reflected by dust 300 is received only by line sensor 213G and not received by line sensor 213R or 213B.

Furthermore, as platen 205 oscillates, dust 300 will exists at different regions. More specifically, when platen 205 moves in direction D1, dust 300 initially exists at region 205R, then region 205G and finally region 205B. In contrast, when platen 205 moves in a direction opposite direction D1, dust 300 exists initially at region 205B, then region 205G, and finally region 205R.

As such, light reflected by dust 300 is received in such an order that when platen 205 moves in direction D1 the light is received initially by line sensor 213R, then line sensor 213G and finally line sensor 213B and when platen 205 moves opposite to direction D1 the light is received initially by line sensor 213B, then line sensor 213G, and finally line sensor 213R.

When platen 205 moves in a direction in which an original is transported, noise caused by reading dust appears first in an R signal output by line sensor 213R, then in a G signal output by line sensor 213G, and finally in a B signal output by line sensor 213B. When platen 205 moves in a direction opposite the original, noise caused by reading dust appears first in a B signal output from line sensor 213B, then in a G signal output from line sensor 213G, and finally in an R signal output from line sensor 213R. In other words, noise generated by reading dust appears in signals in an order determined by the direction in which platen 205 moves. By determining an order in which noise is detected from R, G and B signals, noise can be detected with higher precision.

Figure 7:
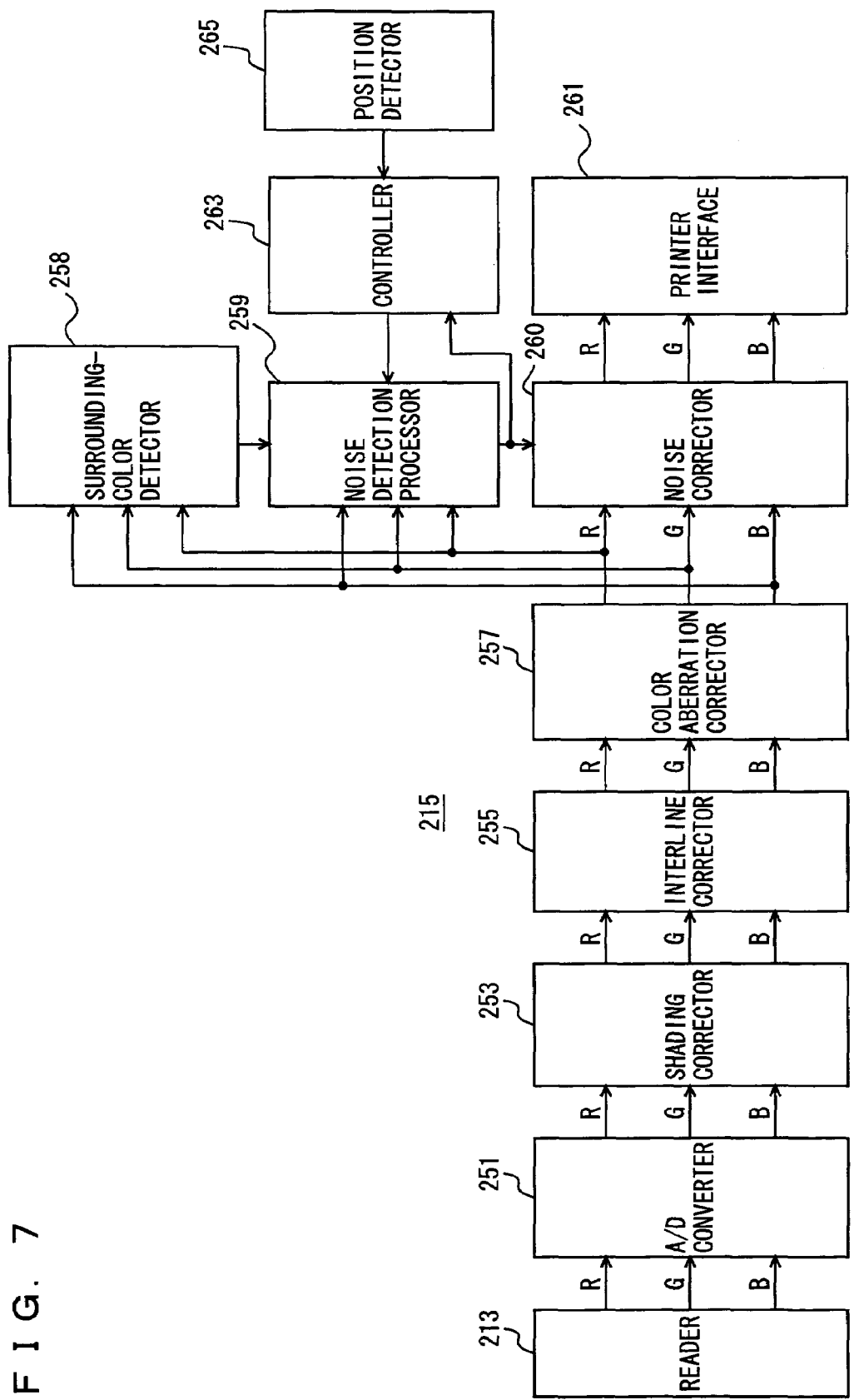
FIG. 7 is a block diagram showing a configuration of an image processor of the image reading apparatus in the present embodiment.

FIG. 7 is a block diagram showing a configuration of the image processor of the image reading apparatus in the present embodiment. With reference to the figure, image processor 215 receives R, G and B signals from reader 213. Image processor 215 includes an analog/digital (A/D) converter 251 receiving an analog signal from reader 213 to convert the analog signal to a digital signal, a shading corrector 253 correcting uneven illumination provided by the source of light 206 or the like, an interline corrector 255 synchronizing the R, G and B signals to be a single line of an original, a color aberration corrector 257 correcting distortion in the main scanning direction introduced by lens 211, a surrounding-color detector 258 detecting from R, G and B signals a color of a pixel neighboring a target pixel, a noise detection processor 259 detecting noise from each of the R, G and B signals, a noise corrector 260 effecting a process to correct a noise pixel, a controller 263 generally controlling image processor 215, and a printer interface 261 used to output an image to image forming apparatus 20. Controller 263 has a position detector 265 connected thereto to detect the position of platen 205. Position detector 265 detects a length of mark 205A of platen 205 in the main scanning direction.

Interline corrector 255 delays the R and G signals by eight and four lines, respectively, to synchronize the R, G and B signals to be a single line of the original, since as has been described previously, line sensors 213R, 213G, 213B are spaced in the sub scanning direction by a distance corresponding to three lines.

Surrounding-color detector 258 receives R, G, and B signals and detects from all of the signals a color of a pixel neighboring each pixel. A neighboring pixel is a pixel which is directly adjacent to a pixel to be processed. Herein a pixel to be processed will be described as a single pixel, however the pixel to be processed can also be a plurality of pixels, and accordingly, pixels surrounding and immediately adjacent to the plurality of pixels will be neighboring pixels. For a plurality of neighboring pixels, a maximum, mean, minimum, or average value of each of R. G and B signals of the neighboring pixels can simply be used.

Surrounding-color detector 258 detects a color of a pixel neighboring each pixel. The color is either achromatic (K), red (R), magenta (M), blue (B), cyan (C), green (G), or yellow (Y). Herein, R, G and B signals are input by one line. Accordingly, a color of a pixel existing in the vicinity of each and every pixel in the one line is detected. The detected color is output to noise detection processor 259 as a color signal corresponding a collection for the one line.

Noise detection processor 259 receives the R, G and B signals from color aberration corrector 257 and from controller 263 the position of platen 205 and a direction in which platen 205 moves, and receives a color signal from surrounding-color detector 258. Noise detection processor 259 detects a noise pixel for each of the R, G and B signals received from color aberration corrector 257, and outputs to noise corrector 260 and controller 263 logical signals of "1" and "0" indicating a noise pixel and a pixel other than a noise pixel, respectively. The detail will be described later.

Noise corrector 260 receives the R, G and B signals from color aberration corrector 257 and from noise detection processor 259 receives for each of the R, G and B signals logical signal of "1" and "0" indicating a noise pixel and a pixel other than a noise pixel, respectively.

Noise corrector 260 determines from logical signals corresponding to the R, G and B signals, respectively, a color of a pixel determined as a noise pixel. More specifically, noise corrector 260 determines a color of a noise pixel successive in the sub scanning direction. Furthermore, if noise pixels are not successive in the sub scanning direction then a color of a pixel existing between two noise pixels is determined, and if the pixels are identically located in the main scanning direction and vary in color in the sub scanning direction in the following order:

(1) CBMRY or YRMBC
(2) CBKRY or YRKBC
(3) RYGCB or BCGYR
(4) RYWCB or BCWYR then the pixels are all determined as noise pixel, wherein R, G, B, C, M, Y, K, and W represent red, green, blue, cyan, magenta, yellow, black, and white, respectively. It should be noted, however, that herein an order in which a color varies is only indicated, and two or more pixels of the same color may be successively provided. For example, it may be CCBBMMRRYY.

Thus if dust has a size read by a plurality of line sensors concurrently, herein a size corresponding to four or more lines, noise caused by reading the dust can be detected.

Furthermore, noise corrector 260 operates for each of the R, G and B signals in response to a logical signal corresponding thereto to replace a value of a pixel determined as a noise pixel with that of a neighboring, non-noise pixel. This can simply be done by replacing the value of the pixel determined as the noise pixel with an average, maximum or minimum value of a plurality of neighboring non-noise pixels. Noise corrector 260 outputs to the printer interface the R, G and B signals with any noise pixels replaced with a neighboring pixel(s).

Controller 263 receives the position of platen 205 from position detector 265 and from noise detection processor 259 logical signals of "1" and "0" indicating a noise pixel and a pixel other than noise pixel, respectively. Controller 263 determines from these signals the dust's location on platen 205. More specifically, it determines the position of platen 205 in the sub scanning direction from the position of platen 205 and a logical signal's line number, and the position of platen 205 in the main scanning direction from a location of a noise pixel of the logical signal.

Figure 8:
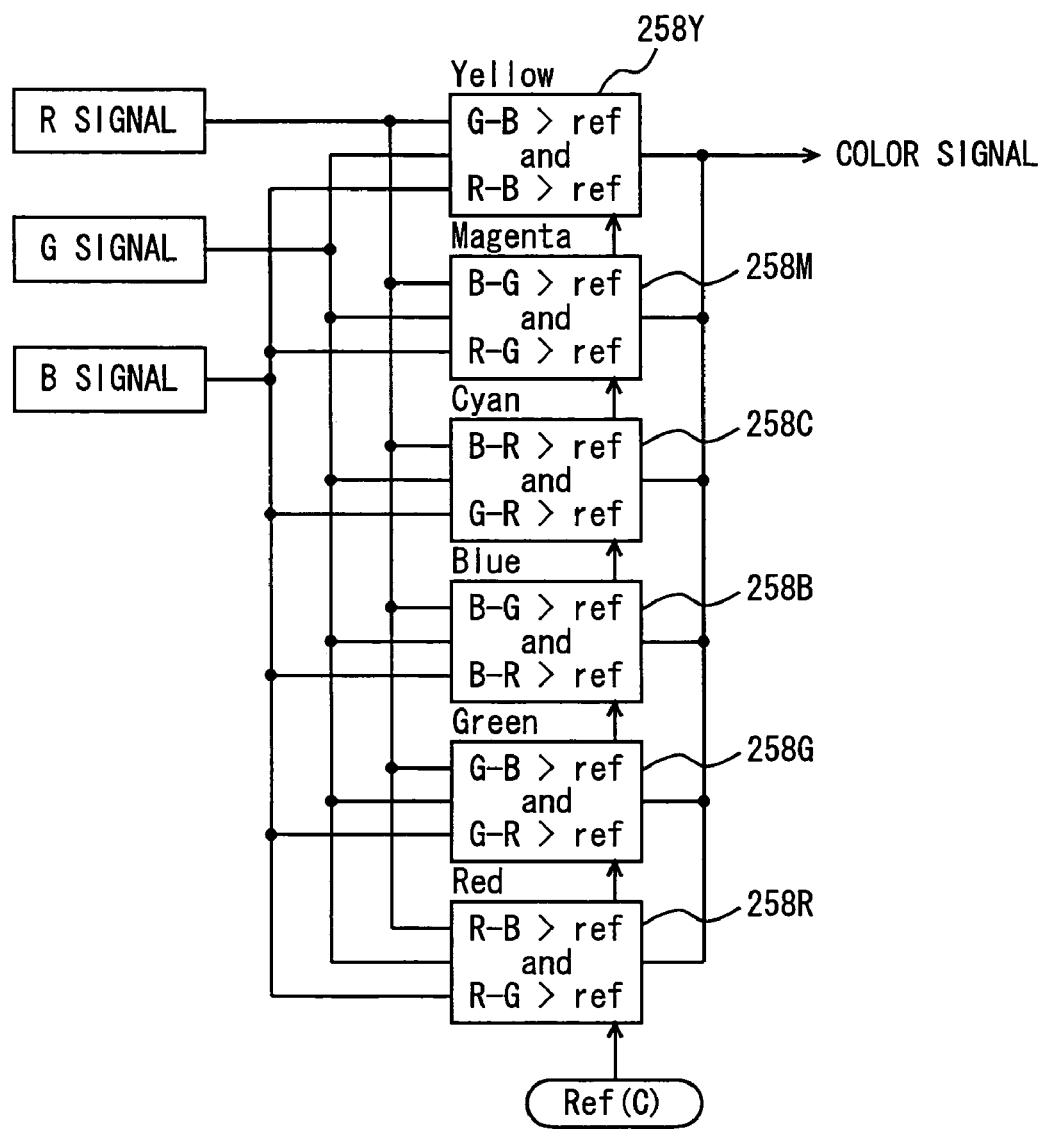
FIG. 8 shows one example of a configuration of a surrounding-color detector.
Figure 9A:
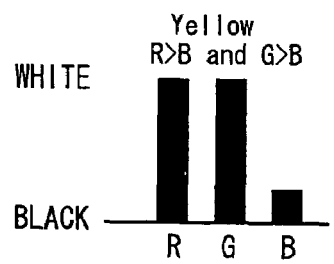
FIGS. 9A-9F show one example of a color detected by the surrounding-color detector.
Figure 9B:
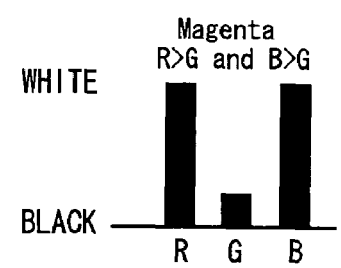
Figure 9C:
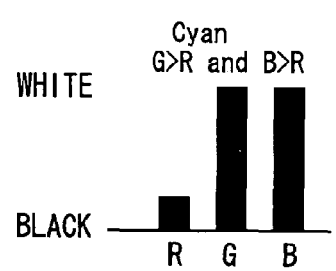
Figure 9D:
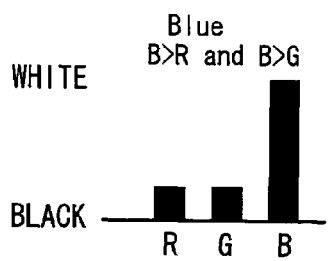
Figure 9E:
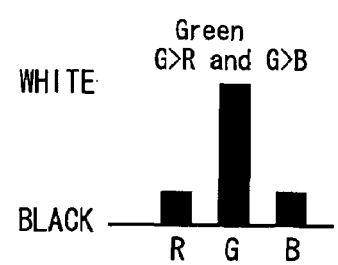
Figure 9F:

FIG. 8 shows one example of a configuration of surrounding-color detector 258. With reference to figure, surrounding-color detector 258 includes color determiners 258Y, 258M, 258C, 258B, 258G and 258R that determine the colors of yellow (Y), magenta (M), cyan (C), blue (B), green (G) and red (R), respectively. Color determiners 258Y, 258M, 258C, 258B, 258G and 258R each receive R, G and B signals and a threshold value Ref(C) having a predetermined value and stored for example in a ROM. Note that threshold value Ref(C) may be a different value for each of color determiners 258Y, 258M, 258C, 258B, 258G and 258R.

Color determiner 258Y determines the color of yellow. Accordingly when G and B signals have a difference greater than threshold value Ref(C) and R and B signals have a difference greater than threshold value Ref(C) color determiner 358Y outputs as a color signal a signal indicating the color of yellow.

Color determiner 258M determines the color of magenta. Accordingly when B and G signals have a difference greater than threshold value Ref(C) and R and G signals have a difference greater than threshold value Ref(C) color determiner 258M outputs as a color signal a signal indicating the color of magenta.

Color determiner 258C determines the color of cyan. Accordingly when B and R signals have a difference greater than threshold value Ref(C) and G and R signals have a difference greater than threshold value Ref(C) color determiner 258C outputs as a color signal a signal indicating the color of cyan.

Color determiner 258B determines the color of blue. Accordingly when B and G signals have a difference greater than threshold value Ref(C) and B and R signals have a difference greater than threshold value Ref(C) color determiner 258B outputs as a color signal a signal indicating the color of blue.

Color determiner 258G determines the color of green. Accordingly when G and B signals have a difference greater than threshold value Ref(C) and G and R signals have a difference greater than threshold value Ref(C) color determiner 258G outputs as a color signal a signal indicating the color of green.

Color determiner 258R determines the color of red. Accordingly when R and B signals have a difference greater than threshold value Ref(C) and R and G signals have a difference greater than threshold value Ref(C) color determiner 258R outputs as a color signal a signal indicating the color of red.

Surrounding-color detector 258 outputs a color signal output from color determiners 258Y, 258M, 258C, 258B, 258G or 258R. If none of color determiners 258Y, 258M, 258C, 258B, 258G, 258R outputs a color signal, surrounding-color detector 258 outputs a signal of an achromatic color.

FIGS. 9A-9F show one example of a color determined by surrounding-color detector 258. FIGS. 9A, 9B, 9C, 9D, 9E, and 9F show one example of lightness satisfying conditions for detecting yellow, magenta, cyan, blue, green, and red, respectively.

The noise detection process will more specifically be described hereinafter. As has been described with reference to FIG. 6, line sensors 213R, 213G and 213B will read different locations on an original at the same timing. Interline corrector 255 synchronizes the R, G and B signals' lines to obtain R, G and B signals having read a single location on the original.

As such, if platen 205 has dust adhering thereon, R, G and B signals having read a single location on an original have one of them affected.

FIGS. 10A and 10B represent an example of RGB signal output from the reader. FIG. 10A shows an example of reading a white area of an original with black dust adhering on the platen's region 205R corresponding to line sensor 213R. Line sensor 213R reads a portion of the original with the black dust on region 205R. Subsequently, the portion of the original moves to regions 205G, 205B corresponding to line sensors 213G, 213B, when the dust does not exist on regions 205G, 205B, since the original and platen 205 moves at different rates. As such line sensors 213G, 213B will read the original's white area. Consequently, only an R signal output from line sensor 213R is reduced in lightness and line sensors 213G, 213B output G and B signals high in lightness. Note that herein, "lightness" indicates a value output from the three line sensors 213R, 213G, 213B corresponding to a reflection of light.

The FIG. 10A RGB signals' combination is seldom output when an original is read without dust adhering thereto. A combination closest thereto is a case where an area of cyan, a color complementary to red, is read. FIG. 10B represents RGB signal output from reader 213 when an original's cyan area is read. The R signal significantly drops in lightness, and the G and B signals also drops in lightness. As such, the variation in lightness of the R signal significantly dropping in lightness can be detected by using a threshold value Ref1(R).

The FIG. 10A RGB signal and the FIG. 10B RGB signal are significantly different in whether the B and G signals are affected. By detecting this difference, black dust can be detected as noise without detecting a cyan line erroneously as noise. As such, the B signal's variation in lightness is detected by using a threshold value Ref2(B). Threshold value Ref2(B) can simply be provided by the smallest one of the following values. Hereinafter, threshold values Ref2(R), Ref2(G), Ref2 (B) are indicated.

(1) Detecting Dust of Achromatic Color High in Lightness

To prevent a cyan line from being detected erroneously as noise, the difference between a maximum value in lightness (255) and one of the values in lightness output from the line sensors other than line sensor 213R, i.e., line sensors 213G and 213B, reading a color complementary to red, or cyan, can be set as Ref2(G), Ref2(B). To prevent a magenta line from being detected erroneously as noise, the difference between the maximum value in lightness (255) and one of the values in lightness output from the line sensors other than line sensor 213G, i.e., line sensors 213R and 213B, reading a color complementary to green, or magenta, can be set as Ref2(R), Ref2(B). To prevent a yellow line from being detected erroneously as noise, the difference between the maximum value in lightness (255) and one of the values in lightness output from the line sensors other than line sensor 213B, i.e., line sensors 213R and 213G, reading a color complementary to blue, or yellow, can be set as Ref2(R), Ref2(G).

(2) Detecting Dust of Achromatic Color Low in Lightness

To prevent a red line from being detected erroneously as noise, the difference between a minimum value in lightness (0) and one of the values in lightness output from the line sensors other than line sensor 213R, i.e., line sensors 213G and 213B, reading red color, can be set as Ref2(G), Ref2(B). To prevent a green line from being detected erroneously as noise, the difference between the minimum value in lightness (0) and one of the values in lightness output from the line sensors other than line sensor 213G, i.e., line sensors 213R and 213B, reading green color, can be set as Ref2(R), Ref2 (B). To prevent a blue line from being detected erroneously as noise, the difference between the minimum value in lightness (0) and one of the values in lightness output from the line sensors other than line sensor 213B, i.e., line sensors 213R and 213G, reading blue color, can be set as Ref2(R), Ref2(G).

Thus more than one threshold value Ref2(R), Ref2(G), Ref2(B) are obtained, and a minimum value thereof can simply be used.

While herein black dust is detected as noise, dust of achromatic color other than black can also be detected, since any achromatic dust affects all of R, G and B signals.

Furthermore, while herein a white original is read by way of example, an original of any color other than white may be read.

However, if an original's cyan region is read with dust of achromatic color, e.g., black existing in region 205R corresponding to line sensor 213R, an RGB signal provided as shown in FIG. 10B. As has been described above, if an order in which noise is detected from R, G and B signals is determined so that noise is detected with higher precision, then in the R signal, which should have noise detected first, the dust is not detected as noise, and accordingly in the G and B signals also, the dust will not be detected as noise.

The present embodiment provides image reading apparatus 10 adapted to depend on an original's color to determine from which of R, G and B signals noise is detected, and an order of signals from which noise is detected. Noise can be detected with further improved precision.

FIG. 11 is a block diagram showing a configuration of the noise detection processor of the image reading apparatus in the present embodiment. With reference to the figure, noise detection processor 259 includes first lightness difference detectors 301R, 301G, 301B extracting from R, G and B signals, respectively, a region having a predetermined feature, second lightness difference detectors 302R, 302G, 302B extracting from R, G and B signals, respectively, a region having the predetermined feature, detection result extension processors 303R, 303G, 303B extending the region extracted by the second lightness detectors 302R, 302G, 302B to a vicinity thereof, NOR devices 305R, 305G, 305B, AND devices 307R, 307G, 307B, and detected-area extension processors 309R, 309G, 309B.

R, G, B signals are input to noise detection processor 259, one line at a time, sequentially. Note that the R, G and B signals may be input collectively by a plurality of lines or an entire image.

The first lightness difference detector 301R receives the R signal and threshold value Ref1(R) and extracts from the R signal a region having the predetermined feature of a first level. This region is a region having a limited variation in lightness and a difference in lightness of at least threshold Ref1(R) from a region surrounding it. Such region is only required to have a size of at least one pixel. In this description a pixel included in a region having the predetermined feature of the first level will be referred to as a first feature pixel.

The region having the predetermined feature of the first level may be extracted by employing an edge extraction filter. More than one edge extraction filter are prepared for sizes of edge regions, respectively, and a value obtained as a result of filtering is compared with threshold value Ref22(R). A pixel satisfying a condition with threshold value Ref1(R) is determined as a center pixel of an edge region and from an edge extraction filter satisfying that condition the edge region's size is obtained.

Figures 12A, 12B, 12C, 12D, 12E, 12F:
FIGS. 12A-12F show one example of an edge extraction filter.

FIGS. 12A-12F represent the edge extraction filter by way of example. FIG. 12A represents an edge extraction filter used to detect an edge region of a size of one pixel when an R signal is input, one line at a time. FIG. 12B represents an edge extraction filter used to detect an edge region of a size of one pixel when an R signal is input in a plurality of lines correctively.

FIG. 12C represents an edge extraction filter used to detect an edge region of a size of three pixels when an R signal is input, one line at a time. FIG. 12D represents an edge extraction filter used to detect an edge region of a size of three pixels when an R signal is input in a plurality of lines correctively.

FIG. 12E represents an edge extraction filter used to detect an edge region of a size of five pixels when an R signal is input, one line at a time. FIG. 12D represents an edge extraction filter used to detect an edge region of a size of five pixels when an R signal is input in a plurality of lines correctively.

These edge extraction filters are established under the following conditions:

(1) An edge region high in lightness is extracted when an average in lightness of pixels A and B minus that in lightness of pixel C equals at least threshold value Ref1(R):

(Average of Pixels $A$ and $B$)−(Average of Pixel $C$)>Ref1($R$).

In that case, the center pixel is one of pixels A, B and C that is the highest in lightness.

(2) An edge region low in lightness is extracted when an average in lightness of pixel C minus that in lightness of pixels A and B equals at least threshold value Ref1(R):

(Average of Pixel $C$)−(Average of Pixels $A$ and $B$)>Ref1($R$).

In that case, the center pixel is one of pixels A, B and C that is the lowest in lightness.

G and B signals can also be handled with an edge extraction filter similar to that used for the R signal.

The first lightness difference detectors 301R, 301G, 301B compare a value calculated by the above described edge extraction filter with threshold values Ref1(R), Ref1(G), Ref1(B).

With reference again to FIG. 11, the first feature pixel extracted by the first lightness difference detector 301R is represented by a logical signal of "1" and a pixel other than the first feature pixel is represented by a logical signal of "0" and thus output to AND device 307R.

The second lightness difference detector 302R receives the R signal and threshold value Ref2(R) and extracts from the R signal a region having the predetermined feature of a second level. This region is a region having a limited variation in lightness and a difference in lightness of at least threshold Ref2(R) from a region surrounding it. Such region is only required to have a size of at least one pixel. In this description a pixel included in a region having the predetermined feature of the second level will be referred to as a second feature pixel. It should be noted that threshold value Ref2(R) is a smaller value than threshold value Ref1(R).

The region having the predetermined feature of the second level may be extracted by employing an edge extraction filter. More than one edge extraction filter are prepared for sizes of edge regions, respectively, and a value obtained as a result of filtering is compared with threshold value Ref2(R). A pixel satisfying a condition with threshold value Ref2(R) is determined as a center pixel of an edge region and from an edge extraction filter satisfying that condition the edge region's size is obtained.

The second lightness difference detectors 302R, 302G, 302B compare a value calculated by the above described edge extraction filter with threshold values Ref2(R), Ref2(G), Ref2(B).

The second feature pixel extracted by the second lightness difference detector 302R is represented by a logical signal of "1" and a pixel other than the second feature pixel is represented by a logical signal of "0" and thus output to detection result extension processor 303R.

Detection result extension processor 303R sets a pixel neighboring the second feature pixel extracted by the second lightness difference detector 302R as a second feature pixel to extend a region having the predetermined feature of the second level. In other words, a pixel that exists in a vicinity of a pixel of "1" in value as represented by a logical signal received from the second lightness difference detector 302R and has a value of "0" is changed to "1". Noise can be detected with higher precision. A logical signal having contributed to extended region is output to NOR devices 305G, 305B.

The first lightness difference detector 301G receives the G signal and threshold value Ref1(G) and extracts from the G signal a region having the predetermined feature of the first level. This region is a region having a limited variation in lightness and a difference in lightness of at least threshold Ref1(G) from a region surrounding it.

The region having the predetermined feature of the first level may be extracted by employing an edge extraction filter. More than one edge extraction filter are prepared for sizes of edge regions, respectively, and a value obtained as a result of filtering is compared with threshold value Ref1(G). A pixel satisfying a condition with threshold value Ref1(G) is determined as a center pixel of an edge region and from an edge extraction filter satisfying that condition the edge region's size is obtained.

The feature pixel extracted by the first lightness difference detector 301G is represented by a logical signal of "1" and a pixel other than the first feature pixel is represented by a logical signal of "0" and thus output to AND device 307G.

The second lightness difference detector 302G receives the G signal and threshold value Ref2(G) and extracts from the G signal a region having the predetermined feature of the second level. This region is a region having a limited variation in lightness and a difference in lightness of at least threshold Ref2(G) from a region surrounding it. Such region is only required to have a size of at least one pixel. In this description a pixel included in a region having the predetermined feature of the second level will be referred to as a second feature pixel. It should be noted that threshold value Ref2(G) is a smaller value than threshold value Ref1(G).

The region having the predetermined feature of the second level may be extracted by employing an edge extraction filter. More than one edge extraction filter are prepared for sizes of edge regions, respectively, and a value obtained as a result of filtering is compared with threshold value Ref2(G). A pixel satisfying a condition with threshold value Ref2(G) is determined as a center pixel of an edge region and from an edge extraction filter satisfying that condition the edge region's size is obtained.

The second feature pixel extracted by the second lightness difference detector 302G is represented by a logical signal of "1" and a pixel other than the second feature pixel is represented by a logical signal of "0" and thus output to detection result extension processor 303R.

Detection result extension processor 303G sets a pixel neighboring the second feature pixel extracted by the second lightness difference detector 302G as a second feature pixel to extend a region having the predetermined feature of the second level. A logical signal having contributed to an extended region is output to NOR devices 305R, 305B.

The first lightness difference detector 301B receives the B signal and threshold value Ref1(B) and extracts from the B signal a region having the predetermined feature of the first level. This region is a region having a limited variation in lightness and a difference in lightness of at least threshold Ref1(B) from a region surrounding it.

The region having the predetermined feature of the first level may be extracted by employing an edge extraction filter. More than one edge extraction filter are prepared for sizes of edge regions, respectively, and a value obtained as a result of filtering is compared with threshold value Ref1(B). A pixel satisfying a condition with threshold value Ref1(B) is determined as a center pixel of an edge region and from an edge extraction filter satisfying that condition the edge region's size is obtained.

The feature pixel extracted by the first lightness difference detector 301B is represented by a logical signal of "1" and a pixel other than the first feature pixel is represented by a logical signal of "0" and thus output to AND device 307B.

The second lightness difference detector 302B receives the B signal and threshold value Ref2(B) and extracts from the B signal a region having the predetermined feature of the second level. This region is a region having a limited variation in lightness and a difference in lightness of at least threshold Ref2(B) from a region surrounding it. Such region is only required to have a size of at least one pixel. In this description a pixel included in a region having the predetermined feature of the second level will be referred to as a second feature pixel. It should be noted that threshold value Ref2(B) is a smaller value than threshold value Ref1(B).

The region having the predetermined feature of the second level may be extracted by employing an edge extraction filter. More than one edge extraction filter are prepared for sizes of edge regions, respectively, and a value obtained as a result of filtering is compared with threshold value Ref2(B). A pixel satisfying a condition with threshold value Ref2(B) is determined as a center pixel of an edge region and from an edge extraction filter satisfying that condition the edge region's size is obtained.

The second feature pixel extracted by the second lightness difference detector 302B is represented by a logical signal of "1" and a pixel other than the second feature pixel is represented by a logical signal of "0" and thus output to detection result extension processor 303B.

Detection result extension processor 303B sets a pixel neighboring the second feature pixel extracted by the second lightness difference detector 302B as a second feature pixel to extend a region having the predetermined feature of the second level. A logical signal having contributed to an extended region is output to NOR devices 305R, 305G.

NOR device 305R receives from each of detection result extension processor 303G, 303B a logical signal having contributed to an extended region. NOR device 305R outputs to AND device 307R a logical signal corresponding to an inversion of an OR of two received logical signals. More specifically, a pixel which is not a second feature pixel for either a G or B signal is represented by a logical signal of "1" for output and a pixel which is a second feature pixel for at least one of the signals is represented by a logical signal of "0" for output.

AND device 307R outputs to determiner 308 an AND of a logical signal received from the first lightness difference detector 301R and that received from NOR device 305R. More specifically, a pixel which is a first feature pixel for an R signal and not an extended second feature pixel for either a B or G signal is represented by a logical signal of "1" and a pixel different therefrom is represented by a logical signal of "0" for output. A pixel of "1" in value as represented by this logical signal indicates a noise pixel. Thus by NOR device 305R and AND device 307R a first feature pixel extracted from an R signal that has not been extracted as a second feature pixel for either a G or B signal is determined as a noise pixel.

NOR device 305G receives from each of detection result extension processors 303R, 303B a logical signal having contributed to an extended region. NOR device 305G outputs to AND device 307G a logical signal corresponding to an inversion of an OR of two received logical signals. More specifically, a pixel which is not a second feature pixel for either an R or B signal is represented by a logical signal of "1" for output and a pixel which is a second feature pixel for at least one of the signals is represented by a logical signal of "0" for output.

AND device 307G outputs to determiner 308 an AND of a logical signal received from the first lightness difference detector 301G and that received from NOR device 305G. More specifically, a pixel which is a first feature pixel for a G signal and not an extended second feature pixel for either a R or B signal is represented by a logical signal of "1" and a pixel different therefrom is represented by a logical signal of "0" for output. A pixel of "1" in value as represented by this logical signal indicates a noise pixel. Thus by NOR device 305G and AND device 307G a first feature pixel extracted from a G signal that has not been extracted as a second feature pixel for either an R or B signal is determined as a noise pixel.

NOR device 305B receives from each of detection result extension processors 303R, 303G a logical signal having contributed to an extended region. NOR device 305B outputs to AND device 307B a logical signal corresponding to an inversion of an OR of two received logical signals. More specifically, a pixel which is not a second feature pixel for either an R or G signal is represented by a logical signal of "1" for output and a pixel which is a second feature pixel for at least one of the signals is represented by a logical signal of "0" for output.

AND device 307B outputs to determiner 308 an AND of a logical signal received from the first lightness difference detector 301B and that received from NOR device 305B. More specifically, a pixel which is a first feature pixel for a B signal and not an extended second feature pixel for either an R or G signal is represented by a logical signal of "1" and a pixel different therefrom is represented by a logical signal of "0" for output. A pixel of "1" in value as represented by this logical signal indicates a noise pixel. Thus by NOR device 305B and AND device 307B a first feature pixel extracted from a B signal that has not been extracted as a second feature pixel for either an R or G signal is determined as a noise pixel.

Determiner 308 receives a logical signal representing a noise pixel by "1" (hereinafter referred to as a "noise pixel signal") from AND devices 307R, 307G, 307B for R, G, B signals, respectively, one line at a time, sequentially. Furthermore, determiner 308 receives a color signal from surrounding-color detector 258 and a direction in which platen 205 moves from controller 263. Determiner 308 uses the color signal and the direction to correct the noise pixel signal. Line sensor 213R is first arranged, as seen in the direction in which an original is transported D1, followed by line sensors 213G and then 213B, and a direction in which dust moves, i.e., a direction in which platen 205 moves is received from controller 263, and from the order in which line sensors 213R, 213G, 213B are arranged and the direction in which platen 205 moves, an order of R, G and B signals from which a noise pixel is detected is determined. More specifically, if platen 205 moves in direction D1 a noise pixel is detected first from an R signal, followed by G and then B signals. If platen 205 moves in a direction opposite direction D1, then a noise pixel is detected first from a B signal, then a G signal, and finally from an R signal.

Line sensors 213R, 213G and 213B each react to light of a limited range in wavelength. As such, if the platen has black dust adhering thereon and the location on an original that is to be read has a color reflecting light other than a range in waveform as limited for each line sensor 213G, 213G and 213B, it is not detected as a noise pixel. If the platen has white dust adhering thereon and the location on an original that is to be read has a color reflecting light falling within a range in waveform as limited for each line sensor 213R, 213G and 213B then it is not detected as a noise pixel. As such, for some colors represented on an original, there is a signal of R, G, and B signals from which a noise pixel is not detected.

Determiner 308 examines an order of appearance of noise pixel for noise pixel signals received from AND devices 307R, 307G, 307B, one line at a time, sequentially, for a pixel of the same location as seen in the main scanning direction, and invalidates a noise pixel that does not follow a predetermined order of appearance to correct noise pixel. As such, determiners 308 determines from a direction in which platen 205 moves and a color of a neighboring pixel a noise pixel signal from which a noise pixel is initially detected (first data), and a noise pixel is invalidated which appears before a noise pixel does for the first data decided. Determiner 308 receives R, G and B signals' respective noise pixel signals, one line at a time, sequentially. Any noise pixels specified by the noise pixel signals that are positionally identical in the main scanning direction and exist in a line preceding a line including a noise pixel specified by the noise pixel signal for which a decision is made that a noise pixel is initially detected therefrom are invalidated. Only a noise signal which has not been invalidated is represented by a logical signal of "1" which is output to detected-area extension processors 309R, 309G and 309B.

If detected-area extension processor 309R receives a logical signal of "1" from AND device 307R for a pixel, detected-area extension processor 309R sets a pixel that exists in a vicinity of the pixel corresponding to the "1" to a "1" to extend a noise pixel's range. This is done to provide improved precision with which a noise pixel is corrected. The noise pixel extended in range is represented by a logical signal of "1" which is in turn output to noise corrector 260.

If detected-area extension processor 309G receives a logical signal of "1" from AND device 307G for a pixel, detected-area extension processor 309G sets a pixel that exists in a vicinity of the pixel corresponding to the "1" to a "1" to extend a noise pixel's range. This is done to provide improved precision with which a noise pixel is corrected. The noise pixel extended in range is represented by a logical signal of "1" which is in turn output to noise corrector 260.

If detected-area extension processor 309B receives a logical signal of "1" from AND device 307B for a pixel, detected-area extension processor 309B sets a pixel that exists in a vicinity of the pixel corresponding to the "1" to a "1" to extend a noise pixel's range. This is done to provide improved precision with which a noise pixel is corrected. The noise pixel extended in range is represented by a logical signal of "1" which is in turn output to noise corrector 260.

Figure 13:
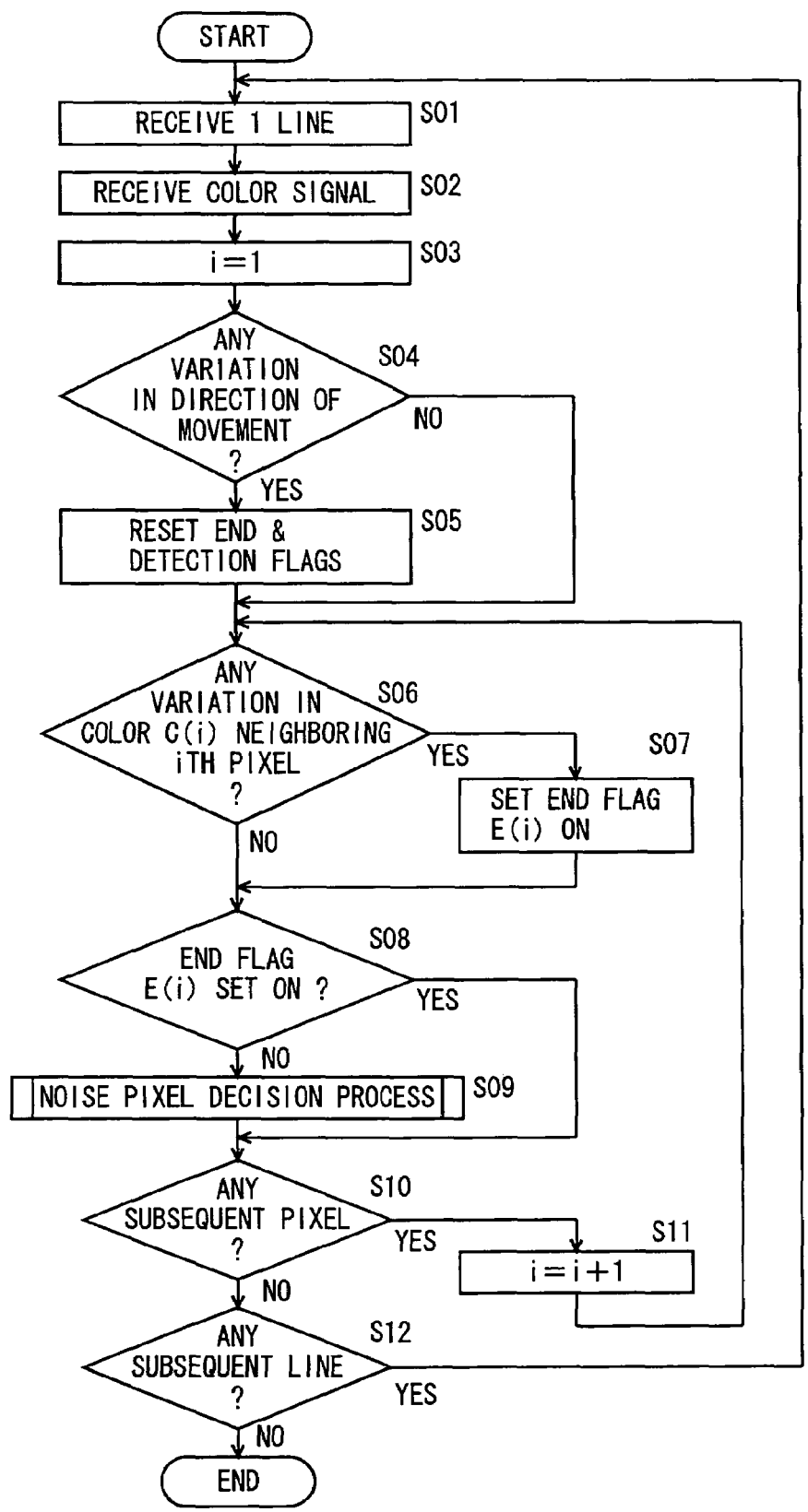
FIG. 13 is a flow chart of a process effected in the noise detection processor by a determiner.

FIG. 13 is a flow chart of a process effected in the noise detection processor by the determiner. With reference to the figure, determiner 308 receives one line of noise pixel signal from AND device 307R, 307G and 307B (step (S)01) and receives a color signal (S02), and a variable i employed to determine a location of a pixel in the main scanning direction is initialized (S03). Herein, variable i is substituted by "1" to determine an initial pixel in the main scanning direction.

Then at S04 a decision is made from a direction in which platen 205 moves, as received from controller 263, as to whether the direction in which platen 205 moves has varied. If so then the process proceeds with S05. Otherwise, S05 is skipped to proceed with S06. At S05, an end flag E(i) and a detection flag F(i) are set to be off to be reset. The flags are provided for each location of pixel in the main scanning direction. End flag E(i) is employed to indicate that in an arrangement of pixels, as seen in the main scanning direction, to be processed, a neighboring pixel's color has changed, and it is set at S07 to be on. End flag E(i) is used to determine whether to effect a noise pixel decision process as described hereinafter. Detection flag F(i) is employed to indicate that for a noise pixel signal for which a decision is made that a noise pixel is initially detected, a line having noise pixel has been input. Detection flag F(i) is used in the noise pixel decision process as described hereinafter to determine whether to invalidate a noise pixel.

At S06 a decision is made as to whether a pixel neighboring an ith pixel in the main scanning direction has changed in color (a surrounding color C(i)). Whether surrounding color C(i) has varied is determined for each location i of a pixel, as seen in the main scanning direction, to be processed. More specifically, a decision is made as to whether surrounding color C(i) of a pixel i of the immediately preceding line and that of pixel i of a line to be currently processed match in value. If there is a variation then the process proceeds with S07. Otherwise the process skips S07 to proceed with S08. At S07, end flag E(i) is set to be on.

At S08, a decision is made as to whether end flag E(i) is on. If so the process skips S09 to proceed with S10. End flag E(i) is set to be on when surrounding color C(i) has varied, and if surrounding color C(i) has varied, then for a pixel of location i in the main scanning direction the noise pixel decision process is interrupted. This is because if a surrounding color has varied, a noise pixel signal from which a noise pixel is initially detected, varies. If end flag (i) is not on then the process proceeds with S09 to effect the noise pixel decision process (S09).

Then at S10 a decision is made as to whether there exists a pixel to be subsequently processed. If so then the process proceeds with S11 to have variable i plus one to change a pixel to be processed and returns to S06, and for the pixel to be processed, as changed, the series of S06-S10 is repeated. All pixels of line input at S01 arranged in the main scanning direction are thus processed.

If at S10 a decision is made that there does not exist a pixel to be processed then the process proceeds with S12, at which step a decision is made as to whether there is a line to be subsequently processed. If so, the process returns to S01. If not, the process ends.

Figure 14A:
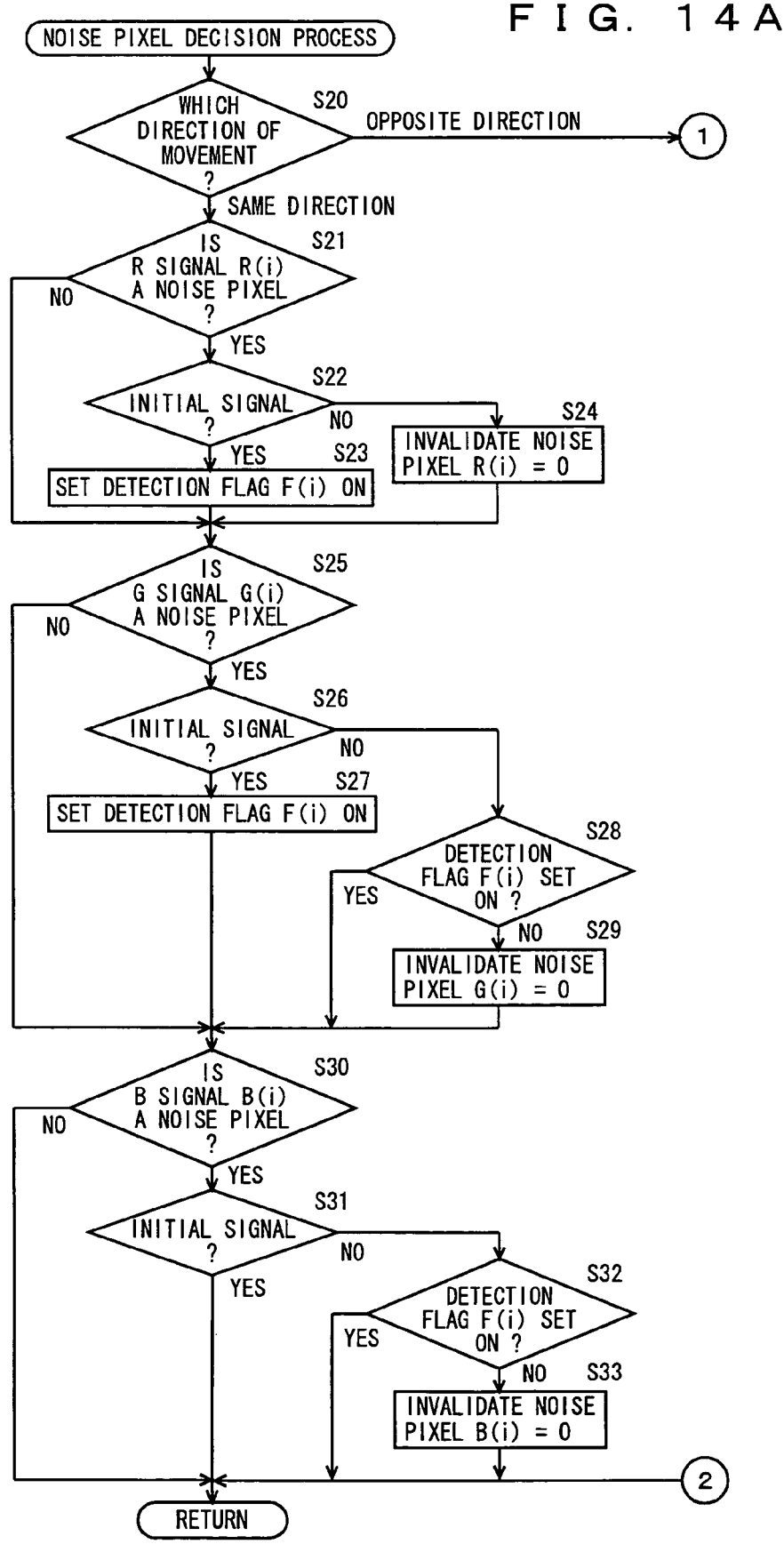
FIGS. 14A and 14B are flow charts of a process executed in FIG. 13 at step S09 to determine a noise pixel.
Figure 14B:
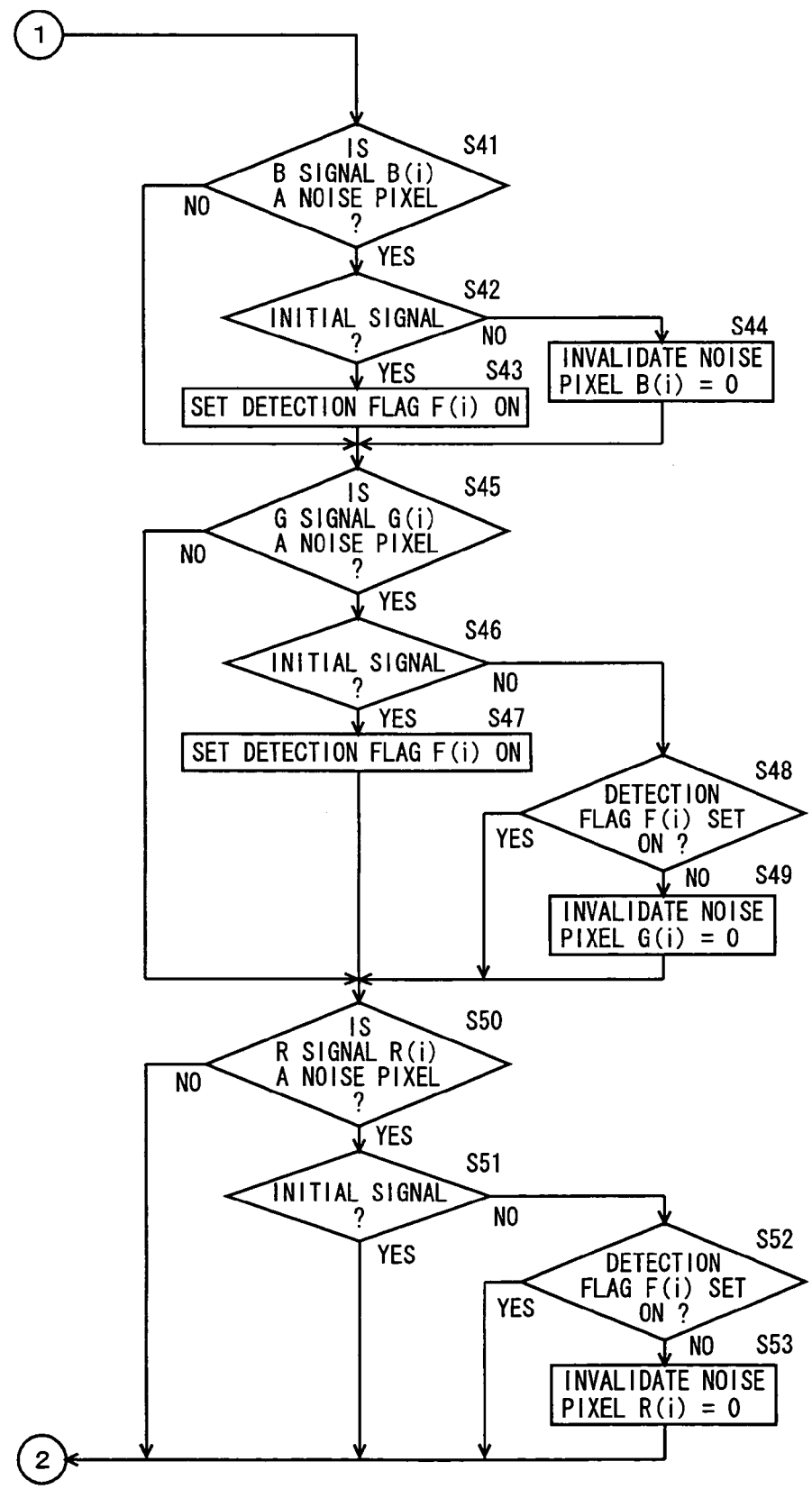

FIGS. 14A and 14B are flow charts of the noise pixel decision process effected in FIG. 13 at S09. At S20 a decision is made as to whether in which direction platen 205 moves. If platen moves in a direction identical to direction D1 then the process proceeds with S21. If the platen moves in the opposite direction then the process proceeds with S41. When platen 205 moves in the same direction as direction D1, dust is detected first in an R signal, followed by G and then B signals. For the opposite direction, dust is detected first in a B signal, followed by G and then R signals. This is done because for different directions in which platen 205 is transported, a noise pixel signal from which a noise pixel is detected varies in order.

At S21 a decision is made as to whether an ith signal R(i), as seen in the main scanning direction, of a noise pixel signal corresponding to an R signal, is a noise pixel. If it is true then the process proceeds with S22. If it is false then the process proceeds with S25. At S22 a decision is made as to whether the noise pixel signal corresponding to the R signal is a signal from which a noise pixel is initially detected. The S22 decision is made with reference to a decision table previously stored by determiner 308 for example to a ROM. As has been described above, a place in an order of a noise pixel signal from which a noise pixel is detected is determined from a direction in which platen 205 moves and a color (surrounding color C(i)) surrounding a pixel to be processed. The decision table defines a place in an order, as determined from the direction and the color, of a noise pixel signal from which a noise pixel is detected.

FIG. 15 shows one example of the decision table. With reference to the figure, the table defines for each surrounding color a noise pixel signal from which a noise pixel is detected and the signal's place in an order when the platen moves in the same direction as the original and black dust is read. Furthermore the table defines for each surrounding color a noise pixel signal from which a noise pixel is detected and the signal's place in an order when the platen moves in the direction opposite to that of the original and black dust is read.

Note that an order of noise pixel signals from which noise is detected as shown in FIG. 15 indicates that provided when platen 205 moves in the same direction as the original at a rate slower than that of the original. If platen 205 moves at a rate greater than the original, the order is reversed.

The surrounding color includes achromatic color (K), red (R), magenta (M), blue (B), cyan (C), green (G) and yellow (Y). In the figure, these colors are represented by K, Y, M, C, R, G, B and an arrow indicates an order. For example, "R→G→B" indicates that a noise pixel signal from which a noise pixel should initially be detected is that corresponding to an R signal, a noise pixel signal from which a noise pixel should secondly be detected is that corresponding to a G signal, and that a noise pixel signal from which a noise pixel should thirdly be detected is that corresponding to a B signal. Furthermore, "R→B" indicates that a noise pixel signal from which a noise pixel should initially be detected is that corresponding to an R signal, a noise pixel signal from which a noise pixel should secondly be detected is that corresponding to a B signal, and that from a G signal a noise pixel is not detected. Note that at the place in an order of a noise pixel signal from which a noise pixel is not detected, is defined as the last place.

With reference again to FIGS. 14A and 14B, if at S22 a noise pixel signal corresponding to an R signal is determined as a signal from which a noise pixel is initially detected then the process proceeds with S23, otherwise the process proceeds with S24. At S23 detection flag F(i) is set to be on and the process proceeds with S25, since a noise pixel is detected from a noise pixel signal to be initially detected and accordingly a decision is made that a noise pixel(s) immediately subsequently detected is/are valid.

At S24 the value "1" of the ith signal R(i), as seen in the main scanning direction, of the noise pixel signal corresponding to the R signal, is changed to "0". Thus a pixel which has once been erroneously determined as a noise pixel can be redetermined correctly as a non noise pixel. Noise pixel can be detected with higher precision. At S25 a decision is made as to whether an ith signal G(i), as seen in the main scanning direction, of a noise pixel corresponding to a G signal, is a noise pixel. If it is true then the process proceeds with S26. If it is false then the process proceeds with S30. At S26 a decision is made as to whether the noise pixel signal corresponding to the G signal is a signal from which a noise pixel is initially detected. The S26 decision is made with reference to the decision table previously stored by determiner 308 for example to a ROM. If at S26 the noise pixel signal corresponding to the G signal is determined as a signal from which a noise pixel is initially detected then the process proceeds with S27, otherwise the process proceeds with S28. At S27 detection flag F(i) is set to be on and the process proceeds with S30, since a noise pixel is detected from a noise pixel signal to be initially detected and accordingly a decision is made that a noise pixel(s) immediately subsequently detected is/are valid.

At S28 a decision is made as to whether detection flag F(i) is set on. If it is true the process skips S29 to proceed with S30. If it is false then the process proceeds with S29. The process proceeds with S28 when a decision is made that the noise pixel signal corresponding to the G signal is not a signal from which a noise pixel is initially detected. In that case, the noise pixel signal from which a noise pixel is initially detected is a noise pixel signal corresponding to the R signal, and only if a noise pixel has already been detected for that noise pixel signal, a noise pixel of the noise pixel signal corresponding to the G signal is validated. As such, if detection flag F(i) is not set on i.e., there has not yet been a noise pixel detected in a noise pixel signal corresponding to the R signal, the value "1" of the ith signal G(i), as seen in the main scanning direction, of the noise pixel signal corresponding to the G signal is changed to "0" (S29). Thus a pixel which has once been erroneously determined as a noise pixel can be redetermined correctly as a non noise pixel. Noise pixel can be detected with higher precision.

At S30 a decision is made as to whether an ith signal B(i), as seen in the main scanning direction, of a noise pixel signal corresponding to a B signal, is a noise pixel. If it is true then the process proceeds with S31. If it is false the process returns. At S31 a decision is made as to whether the noise pixel signal corresponding to the B signal is a signal from which a noise pixel is initially detected. The S31 decision is made with reference to the decision table previously stored by determiner 308 for example to a ROM. If at S31 the noise pixel signal corresponding to the B signal is determined as a signal from which a noise pixel is initially detected then the process returns, otherwise the process proceeds with S32.

At S32 a decision is made as to whether detection flag F(i) is set on. If it is true the process skips S33 and returns. If it is false then the process proceeds with S33. The process proceeds with S32 when a decision is made that the noise pixel signal corresponding to the B signal is not a signal from which a noise pixel is initially detected. In that case, the noise pixel signal from which a noise pixel is initially detected is a noise pixel signal corresponding to the R or G signal, and only if a noise pixel has already been detected for those noise pixel signals, a noise pixel of the noise pixel signal corresponding to the B signal is validated. As such, if detection flag F(i) is not set on i.e., there has not yet been a noise pixel detected in a noise pixel signal corresponding to the R or G signal, the value "1" of the ith signal B(i), as seen in the main scanning direction, of the noise pixel signal corresponding to the B signal is changed to "0" (S33). Thus a pixel which has once been erroneously determined as a noise pixel can be redetermined correctly as a non noise pixel. Noise pixel can be detected with higher precision.

At S41 a decision is made as to whether the ith signal B(i), as seen in the main scanning direction, of the noise pixel signal corresponding to the B signal, is a noise pixel. If it is true the process proceeds with S42. If it is false the process proceeds with S45. At S42 a decision is made as to whether the noise pixel signal corresponding to the B signal is a signal from which a noise pixel is initially detected. If it is true the process proceeds with S43. If it is false the process proceeds with S44. At S43 detection flag F(i) is set to be on and the process proceeds with S45. At S44 the value "1" of the ith signal B(i), as seen in the main scanning direction, of the noise pixel signal corresponding to the B signal is changed to "0". Thus a pixel which has once been erroneously determined as a noise pixel can be redetermined correctly as a non noise pixel. Noise pixel can be detected with higher precision.

At S45 a decision is made as to whether an ith signal G(i), as seen in the main scanning direction, of the noise pixel signal corresponding to the G signal, is a noise pixel. If it is true the process proceeds with S26. If it is false the process proceeds with S30. At S46 a decision is made as to whether the noise pixel signal corresponding to the G signal is a signal from which a noise pixel is initially detected. If it is true the process proceeds with S47. If it is false the process proceeds with S48. At S47 detection flag F(i) is set to be on and the process proceeds with S50. At S48 a decision is made as to whether detection flag F(i) is set on. If it is true the process skips S49 to proceed with S50. If it is false the process proceeds with S49. At S49 the value "1" of the ith signal G(i), as seen in the main scanning direction, of the noise pixel signal corresponding to the G signal is changed to "0". Thus a pixel which has once been erroneously determined as a noise pixel can be redetermined correctly as a non noise pixel. Noise pixel can be detected with higher precision.

At S50 a decision is made as to whether the ith signal R(i), as seen in the main scanning direction, of the noise pixel signal corresponding to the R signal, is a noise pixel. If it is true the process proceeds with S51. If it is false the process returns. At S51 a decision is made as to whether the noise pixel signal corresponding to the R signal is a signal from which a noise pixel is initially detected. If so the process returns, otherwise the process proceeds with S52. At S52 a decision is made as to whether detection flag F(i) is set on. If it is true the process skips S53 and returns. If it is false the process proceeds with S53. At S53 the value "1" of the ith signal R(i), as seen in the main scanning direction, of the noise pixel signal corresponding to the R signal is changed to "0". Thus a pixel which has once been erroneously determined as a noise pixel can be redetermined correctly as a non noise pixel. Noise pixel can be detected with higher precision.

<Noise Pixel Decision Process in Exemplary Variation>

Hereinafter the noise pixel decision process in an exemplary variation will be described. In this exemplary variation, only a noise pixel which follows an order of noise pixel signals from which a noise pixel is detected, as defined in the decision table is validated and a noise pixel which does not follow the order is invalidated.

Figure 16A:
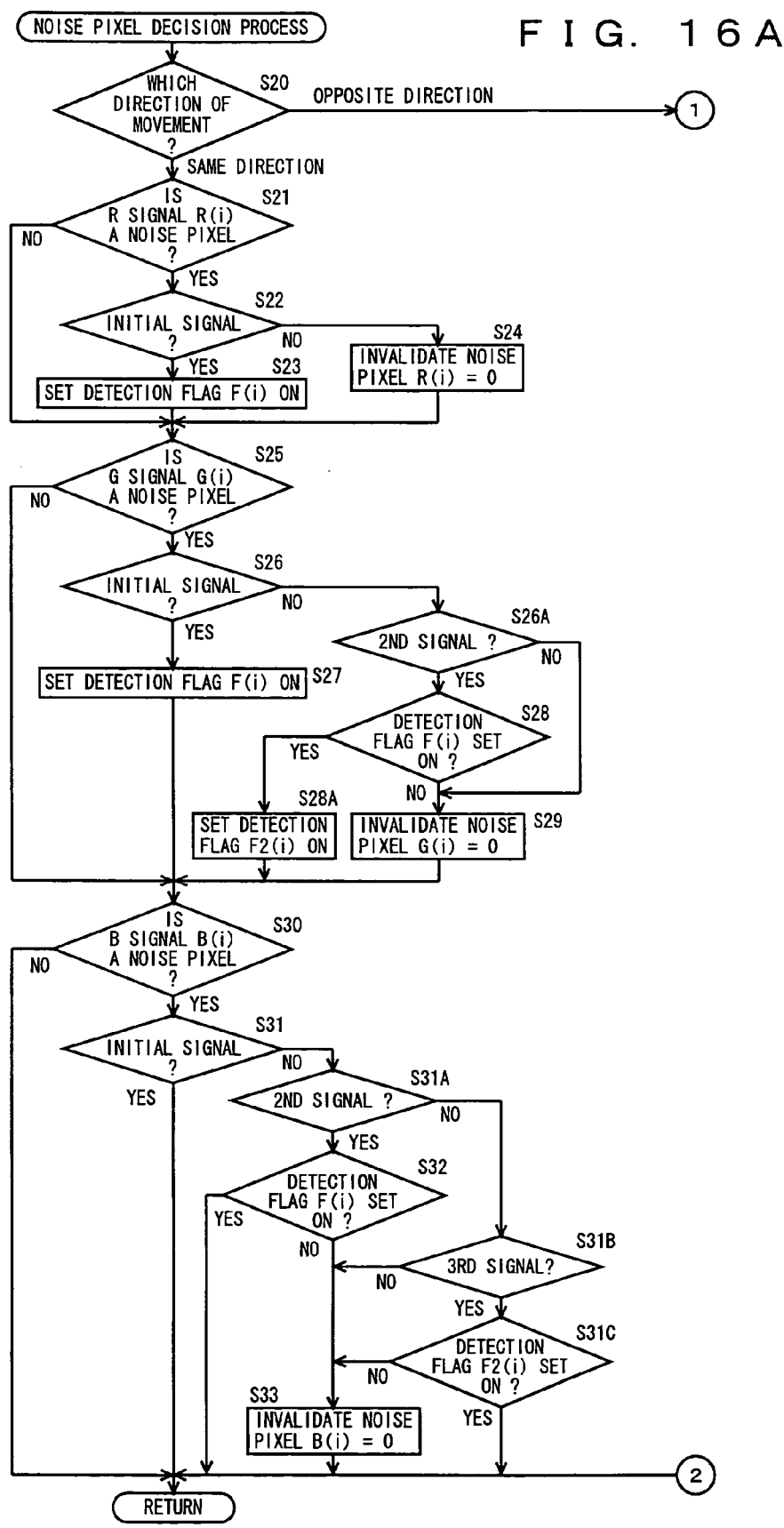
FIGS. 16A and 16B are flow charts of a process in a variation performed to determine a noise pixel.
Figure 16B:
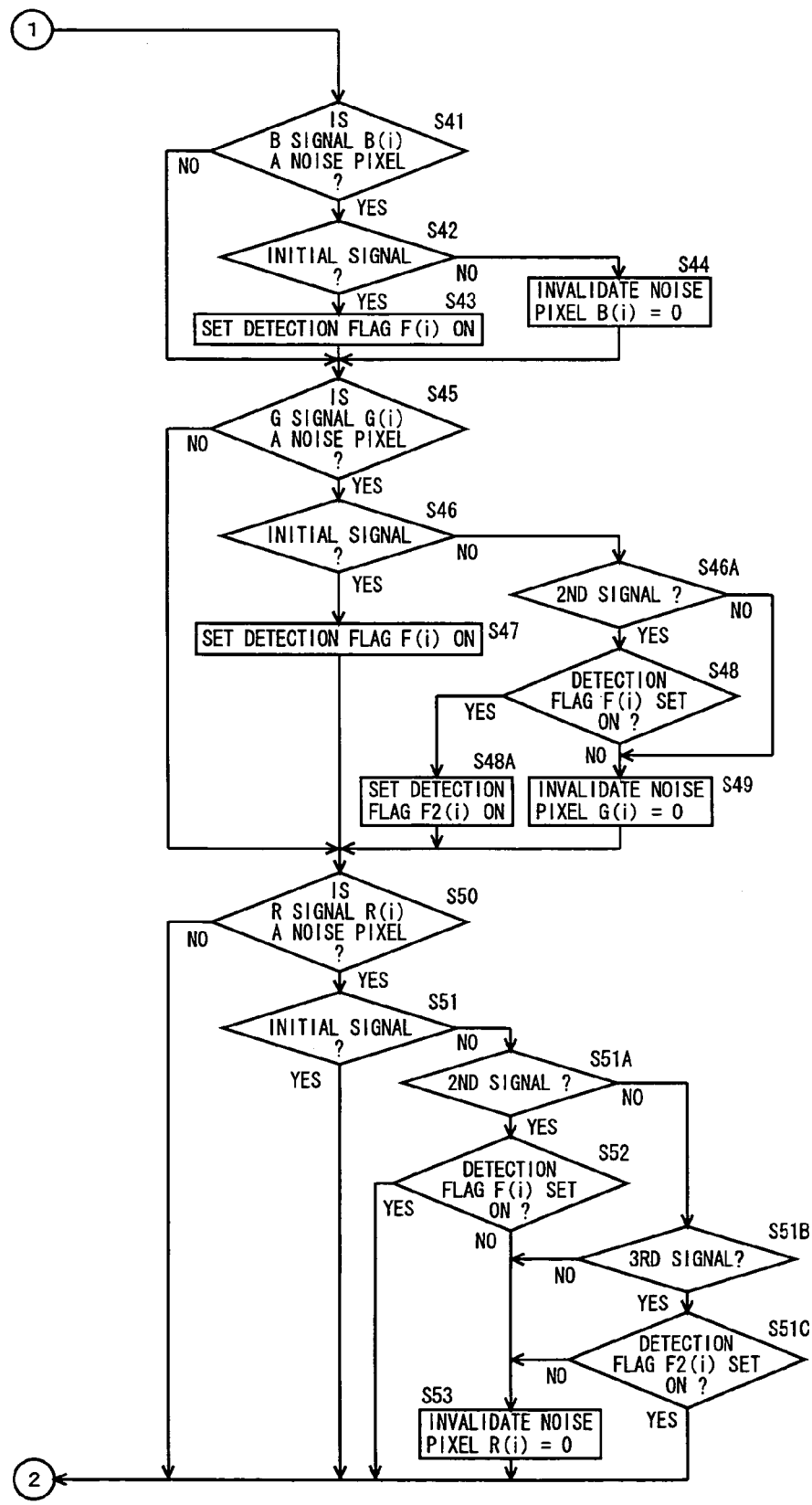

FIGS. 16A and 16B are flow charts of the noise pixel decision process in a variation. In FIGS. 16A and 16B, steps identical to those indicated in FIGS. 14A and 14B are identically labeled. Hereinafter, steps different from those of FIGS. 14A and 14B will mainly be described. With reference to FIGS. 16A and 16B, if at S26 a decision is made that a noise pixel signal corresponding to a G signal is not a signal from which a noise pixel is initially detected the process proceeds with S26A, at which step a decision is made as to whether the noise pixel signal corresponding to the G signal is a signal from which a noise signal is secondly detected. The S26A decision is made with reference to a decision table previously stored by determiner 308 for example to a ROM. If at S26A a decision is made that the noise pixel signal corresponding to the G signal is a signal from which a noise pixel is secondly detected then the process proceeds with S28, otherwise with S29.

At S28 a decision is made as to whether detection flag F(i) is set on. If it is true the process proceeds with S28A. If it is false then the process proceeds with S29. The process proceeds with S28 when a decision is made that the noise pixel signal corresponding to the G signal is a signal from which a noise pixel is secondly detected. In that case, the noise pixel signal from which a noise pixel is initially detected is a noise pixel signal corresponding to an R signal, and only if a noise pixel has already been detected for that noise pixel signal, a noise pixel of the noise pixel signal corresponding to the G signal is validated. As such, if detection flag F(i) is not set on i.e., there has not yet been a noise pixel detected in a noise pixel signal corresponding to the R signal, the value "1" of an ith signal G(i), as seen in the main scanning direction, of the noise pixel signal corresponding to the G signal is changed to "0" (S29). Thus a pixel which has once been erroneously determined as a noise pixel can be redetermined correctly as a non noise pixel. Noise pixel can be detected with higher precision.

At S28A a detection flag F2(i) is set to be on as a noise pixel is detected from a noise pixel signal to be secondly detected and a decision is made that a noise pixel(s) immediately subsequently detected is/are valid.

If at S31 a decision is made that a noise pixel signal corresponding to a B signal is not a signal from which a noise pixel is initially detected the process proceeds with S31A. At S31A a decision is made as to whether the noise pixel signal corresponding to the B signal is a signal from which a noise pixel is secondly detected. The S31A decision is made with reference to the decision table previously stored by determiner 308 for example to a ROM. If at S31A the noise pixel signal corresponding to the B signal is determined as a signal from which a noise pixel is secondly detected then the process proceeds with S32, otherwise the process proceeds with S31B. At S32 a decision is made as to whether decision flag F(i) is set on. If it is true, S33 is skipped and the process returns. If it is false the process proceeds with S33.

The process proceeds with S32 when a decision is made that the noise pixel signal corresponding to the B signal is a signal from which a noise pixel is secondly detected. In that case, the noise pixel signal from which a noise pixel is initially detected is a noise pixel signal corresponding to the R or G signal, and only if a noise pixel has already been detected for those noise pixel signals, a noise pixel of the noise pixel signal corresponding to the B signal is validated. As such, if detection flag F(i) is not set on i.e., there has not yet been a noise pixel detected in a noise pixel signal corresponding to the R or G signal, the value "1" of an ith signal B(i), as seen in the main scanning direction, of the noise pixel signal corresponding to the B signal is changed to "0" (S33). Thus a pixel which has once been erroneously determined as a noise pixel can be redetermined correctly as a non noise pixel. Noise pixel can be detected with higher precision.

At S31B a decision is made as to whether the noise pixel signal corresponding to the B signal is a signal from which a noise pixel is thirdly detected. The S31B decision is made with reference to the decision table previously stored by determiner 308 for example to a ROM. The process proceeds with S31B if the noise pixel signal corresponding to the B signal is a signal from which a noise pixel is thirdly detected or if it is a signal undefined in order. If at S31B a decision is made that the noise pixel signal corresponding to the B signal is a signal from which a noise pixel is thirdly detected then the process proceeds with S31C. If it is a signal undefined in order the process proceeds with S33.

At S31C a decision is made as to whether a detection flag F2(i) is set on. If it is true the process skips S33 and returns. If it is false the process proceeds with S33. The process proceeds with S31C when a decision is made that the noise pixel signal corresponding to the B signal is a signal from which a noise pixel is thirdly detected. In that case, the noise pixel signal from which a noise pixel is secondly detected is a noise pixel signal corresponding to the G signal, and only if a noise pixel has already been detected for that noise pixel signal, a noise pixel of the noise pixel signal corresponding to the B signal is validated. As such, if detection flag F2(i) is not set on i.e., there has not yet been a noise pixel detected in a noise pixel signal corresponding to the G signal, the value "1" of the ith signal B(i), as seen in the main scanning direction, of the noise pixel signal corresponding to the B signal is changed to "0" (S33). Thus a pixel which has once been erroneously determined as a noise pixel can be redetermined correctly as a non noise pixel. Noise pixel can be detected with higher precision.

Furthermore if at S31B a decision is made that the noise pixel signal corresponding to the B signal is undefined in order the process proceeds with S33 as well. Thus a pixel which has once been erroneously determined as a noise pixel can be redetermined correctly as a non noise pixel. Noise pixel can be detected with higher precision.

If at S46 a decision is made that the noise pixel signal corresponding to the G signal is not a signal from which a noise pixel is initially detected the process proceeds with S46A. At S46A a decision is made as to whether the noise pixel signal corresponding to the G signal is a signal from which a noise pixel is secondly detected. The S46A decision is made with reference to the decision table previously stored by determiner 308 for example to a ROM. If at S46A the noise pixel signal corresponding to the G signal is determined as a signal from which a noise pixel is secondly detected then the process proceeds with S48, otherwise the process proceeds with S49.

At S48 a decision is made as to whether detection flag F(i) is set on. If it is true the process proceeds with S48A. If it is false then the process proceeds with S49. The process proceeds with S48 when a decision is made that the noise pixel signal corresponding to the G signal is a signal from which a noise pixel is secondly detected. In that case, the noise pixel signal from which a noise pixel is initially detected is the noise pixel signal corresponding to the B signal, and only if a noise pixel has already been detected for that noise pixel signal, a noise pixel of the noise pixel signal corresponding to the G signal is validated. As such, if detection flag F(i) is not set on i.e., there has not yet been a noise pixel detected in a noise pixel signal corresponding to the B signal, the value "1" of the ith signal G(i), as seen in the main scanning direction, of the noise pixel signal corresponding to the G signal is changed to "0" (S49). Thus a pixel which has once been erroneously determined as a noise pixel can be redetermined correctly as a non noise pixel. Noise pixel can be detected with higher precision.

At S48A a detection flag F2(i) is set to be on as a noise pixel is detected from a noise pixel signal to be secondly detected and a decision is made that a noise pixel(s) immediately subsequently detected is/are valid.

If at S51 a decision is made that the noise pixel signal corresponding to the R signal is not a signal from which a noise pixel is initially detected the process proceeds with S51A. At S51A a decision is made as to whether the noise pixel signal corresponding to the R signal is a signal from which a noise pixel is secondly detected. The S51A decision is made with reference to the decision table previously stored by determiner 308 for example to a ROM. If at S51A the noise pixel signal corresponding to the R signal is determined as a signal from which a noise pixel is secondly detected then the process proceeds with S52, otherwise the process proceeds with S51B. At S52 a decision is made as to whether decision flag F(i) is set on. If it is true, S53 is skipped and the process returns. If it is false the process proceeds with S53.

The process proceeds with S52 when a decision is made that the noise pixel signal corresponding to the R signal is a signal from which a noise pixel is secondly detected. In that case, the noise pixel signal from which a noise pixel is initially detected is a noise pixel signal corresponding to the B or G signal, and only if a noise pixel has already been detected for those noise pixel signals, a noise pixel of the noise pixel signal corresponding to the R signal is validated. As such, if detection flag F(i) is not set on i.e., there has not yet been a noise pixel detected in a noise pixel signal corresponding to the B or G signal, the value "1" of an ith signal R(i), as seen in the main scanning direction, of the noise pixel signal corresponding to the R signal is changed to "0" (S33). Thus a pixel which has once been erroneously determined as a noise pixel can be redetermined correctly as a non noise pixel. Noise pixel can be detected with higher precision.

At S51B a decision is made as to whether the noise pixel signal corresponding to the R signal is a signal from which a noise pixel is thirdly detected. The S51B decision is made with reference to the decision table previously stored by determiner 308 for example to a ROM. The process proceeds with S51B if the noise pixel signal corresponding to the R signal is a signal from which a noise pixel is thirdly detected or if it is a signal undefined in order. If at S51B a decision is made that the noise pixel signal corresponding to the R signal is a signal from which a noise pixel is thirdly detected then the process proceeds with S51C. If it is a signal undefined in order the process proceeds with S53.

At S51C a decision is made as to whether a detection flag F2(i) is set on. If it is true the process skips S53 and returns. If it is false the process proceeds with S53. The process proceeds with S51C when a decision is made that the noise pixel signal corresponding to the R signal is a signal from which a noise pixel is thirdly detected. In that case, the noise pixel signal from which a noise pixel is secondly detected is the noise pixel signal corresponding to the G signal, and only if a noise pixel has already been detected for that noise pixel signal, a noise pixel of the noise pixel signal corresponding to the R signal is validated. As such, if detection flag F2(i) is not set on i.e., there has not yet been a noise pixel detected in a noise pixel signal corresponding to the G signal, the value "1" of the ith signal R(i), as seen in the main scanning direction, of the noise pixel signal corresponding to the R signal is changed to "0" (S53). Thus a pixel which has once been erroneously determined as a noise pixel can be redetermined correctly as a non noise pixel. Noise pixel can be detected with higher precision.

Furthermore if at S51B a decision is made that the noise pixel signal corresponding to the B signal is undefined in order the process proceeds with S53 as well. Thus a pixel which has once been erroneously determined as a noise pixel can be redetermined correctly as a non noise pixel. Noise pixel can be detected with higher precision.

Thus the image reading apparatus 10 noise detection processor 259 extracts the first and second feature pixels from each of R, G and B signals output from the three line sensors 213R, 213G, 213B, and sets as a noise pixel the following pixels:

(1) a pixel which is extracted as a first feature pixel from an R signal and is not extracted as a second feature pixel from a G or B signal;

(2) A pixel which is extracted as a first feature pixel from a G signal and is not extracted as a second feature pixel from a R or B signal; and (3) a pixel which is extracted as a first feature pixel from a B signal and is not extracted as a second feature pixel from a R or G signal.

Then image reading apparatus 10 determines RGB signal from which a noise pixel is detected and their order from a surrounding color and a direction in which platen 205 moves, and validates only a noise pixel detected in accordance with the order.

Thus noise generated by dust existing on the platen can be detected with precision from an image obtained from reading an original.

Note that while in the present embodiment image reading apparatus 10 is provided with the second lightness difference detectors 302R,302G, 302B, the apparatus may dispense with the detectors. In that case, the first lightness difference detectors 301R, 301G, 301B output to detection result extension processors 303R, 303G, 303B a logical signal representing the first feature pixel by "1" and it is extended, and a pixel which is a first feature pixel unextended for the other data is detected as a noise pixel.

Note that while the present embodiment has been described with reader 213 fixed to main body 103 by way of example, alternatively, the present invention is also applicable to moving reader 213 for scanning. For example, the upper restraint plate is of monochromatic color of white or black, and reader 213 or the source of light 206, reflector mirror 209 and reflector member 208 are moved in the sub scanning direction for scanning. During the scan, platen 205 can be oscillated in the sub scanning direction to detect dust adhering on platen 205.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image reading apparatus comprising:
    at least three line sensors having filters, respectively, different in spectral sensitivity, and arranged in a predetermined order in a subscanning direction with a distance therebetween to scan an original in the subscanning direction;
    a platen arranged between the original and said at least three line sensors;
    a mover moving said platen at a rate relative to said at least three line sensors, said rate being different from that of the original relative to said at least three line sensors;
    an interline corrector receiving at least three data from said at least three line sensors to synchronize said at least three data to be a pixel having read a single location on the original; and
    a noise pixel detector receiving said at least three data synchronized by said interline corrector, one line at a time, sequentially, said noise pixel detector including
        an extractor extracting a feature pixel from each of said at least three data, said feature pixel having a predetermined feature,
        a detector comparing said at least three data corresponding to a single location on the original to detect said feature pixel extracted from one of said at least three data, as a noise pixel if said feature pixel is not a feature pixel for each of said at least three data other than said one of said at least three data,
        a color determiner determining a color of each pixel from said at least three data,
        a determiner depending on a color of a pixel neighboring a pixel to be processed selected from pixels arranged in the main scanning direction, to determine among said at least three data first data from which a noise pixel is initially detected, and
        a noise pixel determiner invalidating a noise pixel detected by said detector identical in location in the main scanning direction to said pixel to be processed, that is included in a line input prior to a line including said noise pixel detected from said first data and that is detected from data other than said first data.

2. The image reading apparatus of claim 1, wherein said determiner also depends on a direction of movement of said platen relative to said at least three line sensors to determine said first data.

3. The image reading apparatus of claim 1, wherein said determiner determines said first data whenever said direction of movement of said platen varies.

4. The image reading apparatus of claim 1, wherein:
    said extractor includes a first extractor extracting from each of a plurality of data output from said at least three line sensors a first feature pixel having a predetermined feature of a first level, and a second extractor extracting from each of said plurality of data a second feature pixel having said predetermined feature of a second level; and
    said detector compares said plurality of data corresponding to a single location on the original to detect a first feature pixel extracted from one of said plurality of data, as a noise pixel if a second feature pixel is also not extracted from each of said plurality of data other than said one of said plurality of data.

5. The image reading apparatus of claim 4, wherein said first level is higher than said second level.

6. The image reading apparatus of claim 4, wherein:
    said first extractor includes a first edge extractor employing a first filter to extract an edge region and extracts as said first feature pixel a pixel included in an edge region extracted by said first edge extractor; and
    said second extractor includes a second edge extractor employing a second filter lower in edge detection characteristic than said first filter to extract an edge region, and extracts as said second feature pixel a pixel included in an edge region extracted by said second edge extractor.

7. The image reading apparatus of claim 6, wherein said edge extractor has a plurality of types of filters corresponding to sizes of regions to output a location of a center pixel of an extracted region and a size of said region.

8. The image reading apparatus of claim 4, wherein:
    said first extractor includes a first region extractor extracting a region having a limited variation in lightness and a difference from a neighboring region in lightness of at least a first threshold value, and extracts said extracted region as said first feature pixel; and
    said second extractor includes a second region extractor extracting a region having a limited variation in lightness and a difference from a neighboring region in lightness of at least a second threshold value smaller than said first threshold value, and extracts said extracted region as said second feature pixel.

9. The image reading apparatus of claim 8, wherein said second extractor further includes an extender setting as a second feature pixel a pixel neighboring said second feature pixel extracted.

10. The image reading apparatus of claim 1, wherein said noise pixel determiner validates a noise pixel when said neighboring pixel varies in color.

11. The image reading apparatus of claim 1, further comprising an original transporter transporting the original while said at least three line sensors scan the original.

12. The image reading apparatus of claim 1, wherein said at least three sensors each include a filter different in spectral sensitivity to receive light reflected from the original through said filter.

13. The image reading apparatus of claim 1, further comprising a determiner depending on a variation in color from first through to second noise pixels identically located in a main scanning direction and spaced in the sub scanning direction to determine all of said first through to second noise pixels as noise pixels.

14. An image reading apparatus comprising:
- at least three line sensors having filters, respectively, different in spectral sensitivity, and arranged in a predetermined order in a subscanning direction with a distance therebetween to scan an original in the subscanning direction;
- a platen arranged between the original and said at least three line sensors;
- a mover moving said platen at a rate relative to said at least three line sensors, said rate being different from that of the original relative to said at least three line sensors;
- an interline corrector receiving at least three data from said at least three line sensors to synchronize said at least three data to be a pixel having read a single location on the original; and
- a noise pixel detector receiving said at least three data synchronized by said interline corrector, one line at a time, sequentially, said noise pixel detector including
  - an extractor extracting a feature pixel from each of said at least three data, said feature pixel having a predetermined feature,
  - a detector comparing said at least three data corresponding to a single location on the original to detect said feature pixel extracted from one of said at least three data, as a noise pixel if said feature pixel is not a feature pixel for each of said at least three data other than said one of said at least three data,
  - a color determiner determining a color of each pixel from said at least three data,
  - an order determiner depending on a color of a pixel neighboring a pixel to be processed selected from pixels arranged in the main scanning direction, to determine an order of said at least three data in which a noise pixel is detected, and
  - a noise pixel determiner invalidating a noise pixel detected by said detector identical in location in the main scanning direction to said pixel to be processed, that is included in a line input prior to a line including first data for which a decision is made that a noise pixel is initially detected and that is detected from second data for which a decision is made that a noise pixel is subsequently detected.

15. The image reading apparatus of claim 14, wherein said order determiner also depends on a direction of movement of said platen relative to said at least three line sensors to determine said order.

16. The image reading apparatus of claim 14, wherein said order determiner determines said order whenever said direction of movement of said platen varies.

17. The image reading apparatus of claim 14, wherein said noise pixel determiner validates a noise pixel when said neighboring pixel varies in color.

18. The image reading apparatus of claim 14, further comprising an original transporter transporting the original while said at least three line sensors scan the original.

* * * * *